US012581009B2

(12) United States Patent
Xu

(10) Patent No.: US 12,581,009 B2
(45) Date of Patent: Mar. 17, 2026

(54) DISPLAY METHOD AND ELECTRONIC DEVICE

(71) Applicant: HUAWEI TECHNOLOGIES CO., LTD., Shenzhen (CN)

(72) Inventor: Qiannan Xu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 392 days.

(21) Appl. No.: 18/044,546

(22) PCT Filed: Sep. 7, 2021

(86) PCT No.: PCT/CN2021/116903
§ 371 (c)(1),
(2) Date: Mar. 8, 2023

(87) PCT Pub. No.: WO2022/052908
PCT Pub. Date: Mar. 17, 2022

(65) Prior Publication Data
US 2023/0336654 A1      Oct. 19, 2023

(30) Foreign Application Priority Data

Sep. 10, 2020 (CN) .......................... 202010949088.7
Oct. 22, 2020 (CN) .......................... 202011142468.6

(51) Int. Cl.
*H04M 1/72409* (2021.01)
*G06F 3/14* (2006.01)
*G06F 9/451* (2018.01)

(52) U.S. Cl.
CPC .... *H04M 1/724098* (2022.02); *G06F 3/1454* (2013.01); *G06F 9/451* (2018.02)

(58) Field of Classification Search
CPC ....... H04M 1/724098; H04M 1/72412; H04M 1/72445; H04M 1/72442; H04M 1/72469; G06F 9/451; G06F 3/1454
See application file for complete search history.

(56) References Cited

U.S. PATENT DOCUMENTS 9,592,795 B1      3/2017   Whiteside
2012/0316782 A1   12/2012   Sartipi et al.
2016/0263996 A1*   9/2016   Gerlach ................ H04L 67/125

FOREIGN PATENT DOCUMENTS

CN      108781235 A      11/2018
CN      108983773 A      12/2018
(Continued)

OTHER PUBLICATIONS (CN 104281406 A), Theunstrande et al., Method and System for Managing Information and Entertainment Functions, Jan. 2015, pp. 1-5 (Year: 2015).*
(Continued)

*Primary Examiner* — Keith Ferguson
(74) *Attorney, Agent, or Firm* — Fish & Richardson P.C.

(57) ABSTRACT

In an example display method, a first electronic device establishes a connection to a second electronic device. The first electronic device includes a first application. The first application includes a first interface for being displayed on the first electronic device and a second interface for being displayed on the second electronic device. Then, the first electronic device sends information about the first application to the second electronic device. The second electronic device displays an icon of the first application. The first electronic device displays the first interface in response to an operation performed by a user on an icon of the first application on the first electronic device. After the second electronic device receives the operation performed on the icon of the first application, the first electronic device sends
(Continued)

the second interface to the second electronic device. The second electronic device displays the second interface.

20 Claims, 30 Drawing Sheets

(56)                    References Cited

FOREIGN PATENT DOCUMENTS

| | | |
|---|---|---|
| CN | 110708086 A | 1/2020 |
| EP | 2698968 A1 | 2/2014 |
| WO | 2017135749 A1 | 8/2017 |

OTHER PUBLICATIONS (CN 107203308 A). Fang et al., A Display Method and Terminal, Sep. 2017, pp. 1-8 (Year: 2017).*

International Search Report and Written Opinion in International Appln. No. PCT/CN2021/116903, mailed on Nov. 26, 2021, 17 pages (with English translation).

Extended European Search Report in European Appln No. 21865962. 1, dated Mar. 19, 2024, 12 pages.

* cited by examiner

Electronic device

Vehicle-mounted device

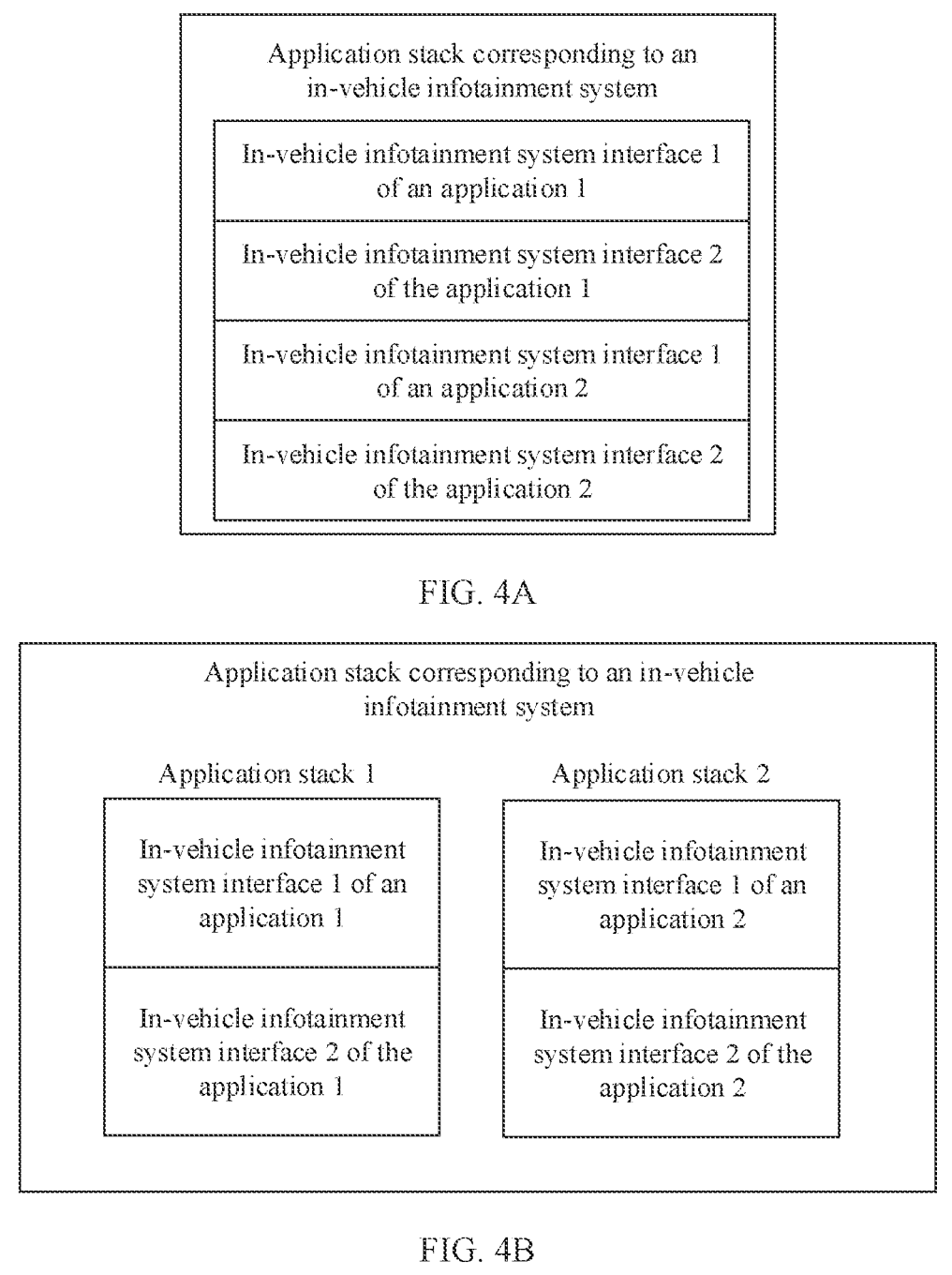

Application stack corresponding to an
in-vehicle infotainment system

In-vehicle infotainment system interface 1
of an application 1

In-vehicle infotainment system interface 2
of the application 1

In-vehicle infotainment system interface 1
of an application 2

In-vehicle infotainment system interface 2
of the application 2

FIG. 4A

Application stack corresponding to an in-vehicle
infotainment system

Application stack 1

Application stack 2

In-vehicle infotainment
system interface 1 of an
application 1

In-vehicle infotainment
system interface 1 of an
application 2

In-vehicle infotainment
system interface 2 of the
application 1

In-vehicle infotainment
system interface 2 of the
application 2

CONT.
FROM

TO

520

CONT.
FROM

TO

CONT.
FROM

TO

540

550

HUAWEI HiCar

Connected to BJ530

Disconnect

October 20                    6°C

Video     Music     Phone     Map

CONT.
FROM

TO

CONT.
FROM

TO

TO

CONT.
FROM

TO

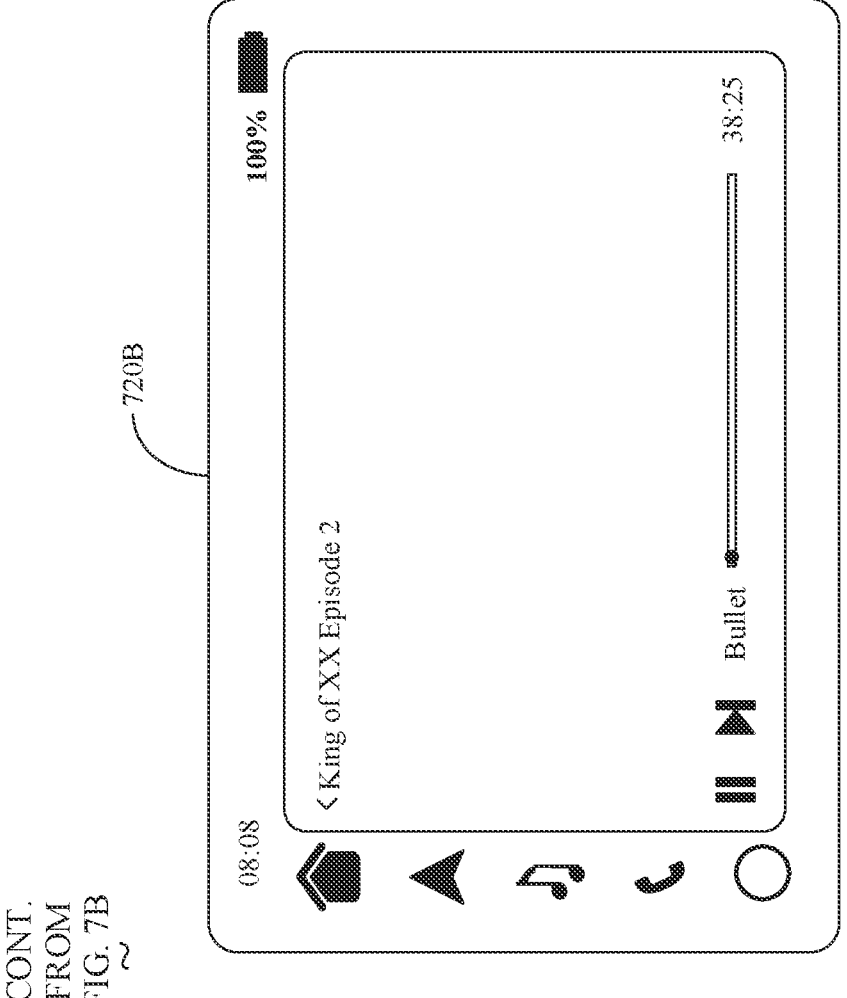
CONT.
FROM
FIG. 7B
720B
FIG. 7C
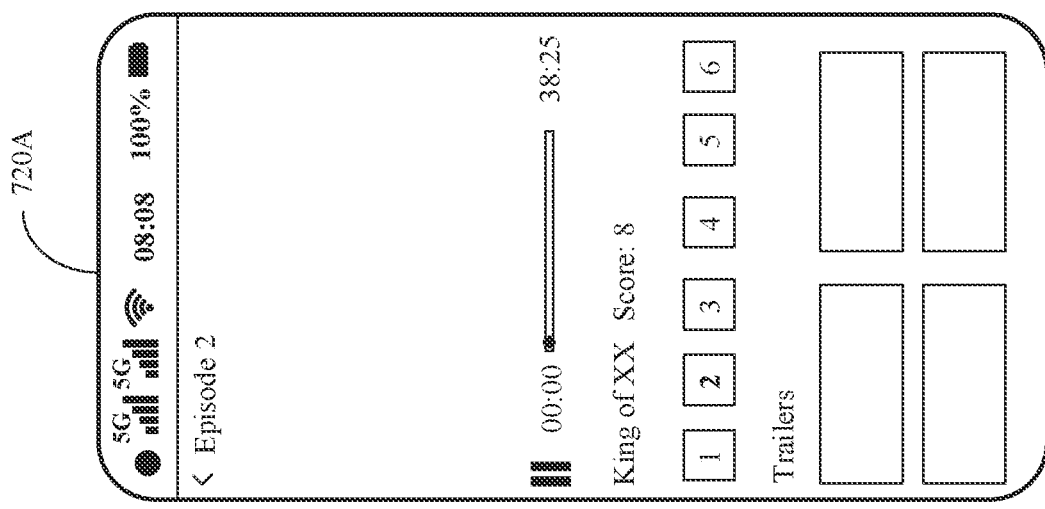
720A

TO

CONT.
FROM

TO

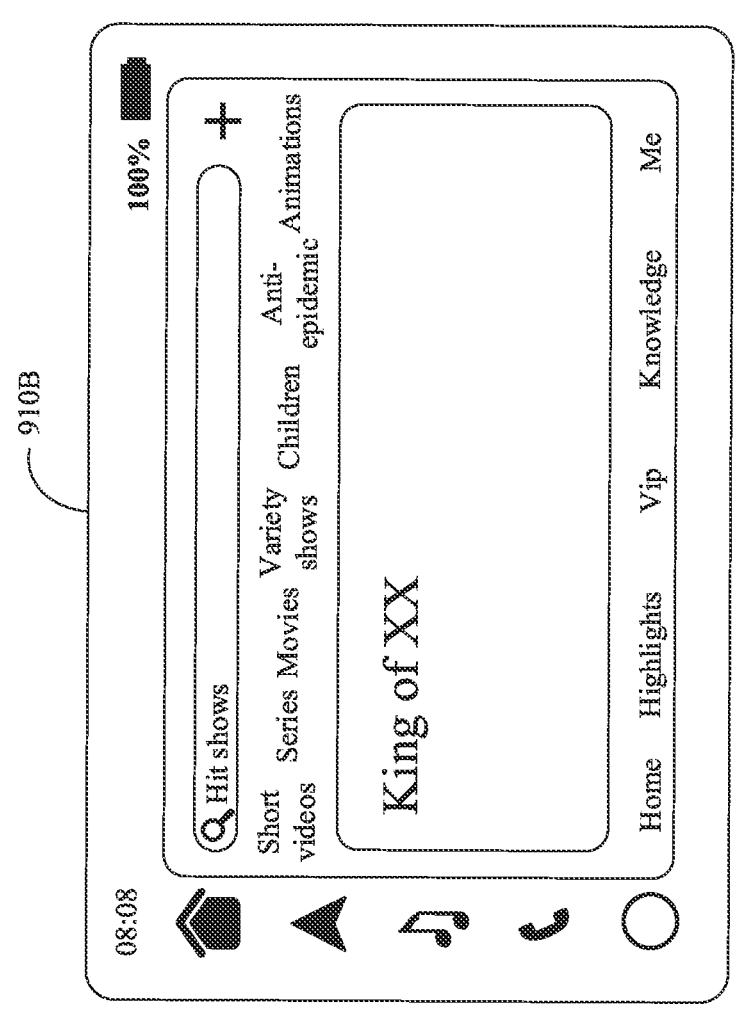
910B
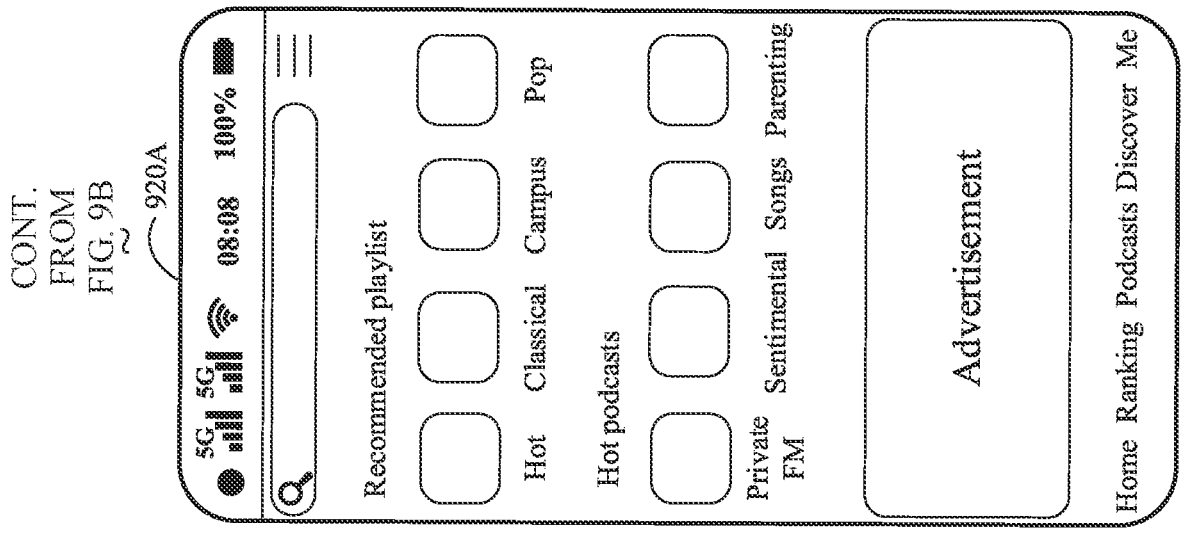
CONT.
FROM
FIG. 9B
920A
FIG. 9C

TO

CONT.
FROM

DISPLAY METHOD AND ELECTRONIC DEVICE

CROSS-REFERENCE TO RELATED APPLICATIONS

This application claims priority to Chinese Patent Application No. 202010949088.7, filed with the China National Intellectual Property Administration on Sep. 10, 2020 and entitled "DISPLAY METHOD AND ELECTRONIC DEVICE", which is incorporated herein by reference in its entirety. This application claims priority to Chinese Patent Application No. 202011142468.6, filed with the China National Intellectual Properly Administration on Oct. 22, 2020 and entitled "DISPLAY METHOD AND ELECTRONIC DEVICE", which is incorporated herein by reference in its entirety.

TECHNICAL FIELD

This application relates to the field of terminal technologies, and in particular, to a display method and an electronic device.

BACKGROUND

With introduction of an in-vehicle system (for example, HiCar®), after a mobile phone is successfully connected to an in-vehicle infotainment system, a service provided by an application installed on the mobile phone can be extended to a vehicle, so that a user can make a call, navigate, listen to music, or the like during driving. However, in the conventional technology, the in-vehicle system generally cannot support the in-vehicle infotainment system and the mobile phone in simultaneously displaying an interlace of a same application. Baidu Maps® installed on the mobile phone is used as an example. If the in-vehicle infotainment system is successfully connected to the mobile phone, when an interface of Baidu Maps is displayed on the in-vehicle infotainment system, the interface of Baidu Maps cannot be displayed on the mobile phone. In this case, the user can perform an operation only on the in-vehicle infotainment system to use a service provided by Baidu Maps, which may be inconvenient for the user.

SUMMARY

Embodiments of this application provide a display method and an electronic device, so that after a mobile phone is successfully connected to an in-vehicle infotainment system, an interface of a same application can be simultaneously displayed on the in-vehicle infotainment system and the mobile phone. Therefore, a user cannot only perform an operation on the in-vehicle infotainment system to enable the in-vehicle infotainment system to provide a corresponding service for the application, but also perform an operation on the mobile phone to enable the in-vehicle infotainment system to provide a corresponding service for the application. This facilitates use by the user.

According to a first aspect, an embodiment of this application provides a display method, applied to a system including a first electronic device and a second electronic device, and specifically including:

The first electronic device establishes a connection to the second electronic device. The first electronic device includes a first application. The first application includes a first interface for being displayed on the first electronic device and a second interface for being displayed on the second electronic device. Then, the first electronic device sends information about the first application to the second electronic device. The second electronic device displays an icon of the first application in response to the received information about the first application. The first electronic device starts the first application and displays the first interface in response to an operation performed by a user on an icon of the first application on the first electronic device. After the second electronic device receives the operation performed on the icon of the first application, the first electronic device sends the second interface to the second electronic device. The second electronic device starts the first application and displays the second interface.

In this embodiment of this application, because the first electronic device can send the information about the first application to the second electronic device after the first electronic device establishes the connection to the second electronic device, the second electronic device can display the icon of the first application. It should be noted that the information about the first application may include the icon, a name, version information, and the like of the first application. The user may perform the operation on the icon of the first application on the first electronic device, so that the first electronic device displays the first interface. The user performs an operation on the icon of the first application on the second electronic device, so that the second electronic device displays the second interface. In this way, after the first electronic device is successfully connected to the second electronic device, an interface of a same application can be simultaneously displayed on the first electronic device and the second electronic device. This facilitates use by the user.

In addition, it should be noted that the first interface is an interface of the first application displayed on the first electronic device, and the second interface is an interface of the first application displayed on the second electronic device. For example, the first electronic device is a mobile phone, and the second electronic device is an in-vehicle infotainment system. The first interface may be understood as a mobile phone interface of the first application, and the second interface may be understood as an in-vehicle infotainment system interface of the first application.

In a possible design, the first interface includes a first option. In response to an operation performed by the user on the first option, the first electronic device displays a third interface of the first application, and the second electronic device displays a fourth interface of the first application.

According to the foregoing technical solution, when the interface of the first application is displayed on both the first electronic device and the second electronic device, both the first electronic device and the second electronic device can make a corresponding response for the first application through the operation performed on the first electronic device. This facilitates the use by the user.

In a possible design, the second interface includes a second option. In response to an operation performed by the user on the second option, the first electronic device displays a fifth interface of the first application, and the second electronic device displays a sixth interface of the first application. According to the foregoing technical solution, when the interface of the first application is displayed on both the first electronic device and the second electronic device, both the first electronic device and the second electronic device can make a corresponding response for the first application through the operation performed on the second electronic device. This facilitates the use by the user.

In a possible design, the first electronic device starts the first application, pins the first interface on top of a first application stack, and displays the first interface in response to the operation performed by the user on the icon of the first application on the first electronic device. For example, the first electronic device is a mobile phone. The first application stack may be understood as an application stack corresponding to the mobile phone, and is used to store a mobile phone interface of an application installed on the mobile phone. The mobile phone displays an interface pinned on top of the application stack corresponding to the mobile phone. This helps simplify an implementation.

In a possible design, after the second electronic device receives the operation performed on the icon of the first application, the first electronic device pins the second interface on top of a second application stack. Because the first electronic device pins the second interface on top of the second application stack and the second application stack is different from the first application stack, the first electronic device and the second electronic device can simultaneously display the interface of the first application. This helps simplify an implementation. For example, the second electronic device is an in-vehicle infotainment system. The second application stack may be an application stack corresponding to the in-vehicle infotainment system.

In a possible design, the first electronic device further includes a second application. The second application stack is used to store the second interface of the first application and a seventh interface of the second application. That is, different applications share one second application stack.

In a possible design, the first electronic device further includes a second application. The second application stack includes an application stack corresponding to the first application and an application stack corresponding to the second application. The application stack corresponding to the first application is used to store the second interface of the first application. The application stack corresponding to the second application is used to store a seventh interface of the second application. In this case, the first electronic device pins the second interface on top of the application stack corresponding to the first application. That is, one application corresponds to one application stack.

In a possible design, the second electronic device receives an operation performed on an icon of the second application. The first electronic device pins the seventh interface on top of the application stack corresponding to the second application, and sends the seventh interface to the second electronic device. The second electronic device starts the second application, displays the seventh interface in a first display area, and displays the second interface in a second display area. The first display area and the second display area are two different display areas of the second electronic device. Because one application corresponds to one application stack, the second electronic device can simultaneously display interfaces of a plurality of applications. This facilitates the use by the user.

In a possible design, when detecting the second electronic device, the first electronic device establishes the connection to the second electronic device; or the first electronic device establishes the connection to the second electronic device through a data cable.

In a possible design, the first electronic device is a mobile phone or a tablet computer, and the second electronic device is an in-vehicle infotainment system.

According to a second aspect, an embodiment of this application provides a display method. The method includes:

A first electronic device establishes a connection to a second electronic device. The first electronic device includes a first application. The first application includes a first interface for being displayed on the first electronic device and a second interface for being displayed on the second electronic device. The first electronic device displays an icon of the first application. The second electronic device displays an icon of the first application.

The first electronic device starts the first application and displays the first interface in response to an operation performed by a user on the icon of the first application on the first electronic device.

First indication information from the second electronic device is received. The first indication information is used to indicate an operation performed on the icon of the first application on the second electronic device.

The second interface is sent to the second electronic device in response to the operation performed on the icon of the first application on the second electronic device, so that the second electronic device displays the second interface.

For example, the first indication information may be transmitted through an input response channel between the first electronic device and the second electronic device. The second interface may be transmitted through an image transmission and display channel between the first electronic device and the second electronic device.

In a possible design, the first interface includes a first option. The first electronic device displays a third interface of the first application on the first display and sends a fourth interface of the first application to the second electronic device in response to an operation performed by the user on the first option, so that the second electronic device displays the fourth interface.

In a possible design, the second interface includes a second option. Second indication information from the second electronic device is received. The second indication information is used to indicate an operation performed on the second option on the second electronic device.

The first electronic device displays a fifth interface of the first application and sends a sixth interface of the first application to the second electronic device in response to the operation performed on the second option on the second electronic device, so that the second electronic device displays the sixth interface.

In a possible design, the first electronic device starts the first application, pins the first interface on top of a first application stack, and displays the first interface in response to the operation performed by the user on the icon of the first application on the first electronic device.

In a possible design, after the second indication information from the second electronic device is received, the method further includes:

The first electronic device pins the second interface on top of a second application stack.

In a possible design, the first electronic device further includes a second application. The second application stack includes an application stack corresponding to the first application and an application stack corresponding to the second application. The application stack corresponding to the first application is used to store the second interface of the first application. The application stack corresponding to the second application is used to store a seventh interface of the second application.

That the first electronic device pins the second interface on top of the second application stack includes:

The first electronic device pins the second interface on top of the application stack corresponding to the first application.

In a possible design, third indication information from the second electronic device is received. The third indication information is used to indicate an operation performed on an icon of the second application on the second electronic device.

The first electronic device pins the seventh interface on top of the application stack corresponding to the second application, and sends the seventh interface to the second electronic device, so that the second electronic device displays the seventh interface in a first area and displays the second interface in a second area. The first area and the second area are different areas on a display of the second electronic device.

According to a third aspect, an embodiment of this application provides an electronic device. The electronic device includes modules/units that perform the method according to the second aspect or any possible design of the second aspect. These modules/units may be implemented by hardware, or may be implemented by hardware executing corresponding software.

According to a fourth aspect, an embodiment of this application provides a chip. The chip is coupled to a memory in an electronic device, and is configured to call a computer program stored in the memory and perform the technical solution according to the second aspect or any possible design of the second aspect in embodiments of this application. In embodiments of this application, "coupled" means that two components are directly or indirectly combined with each other.

According to a fifth aspect, an embodiment of this application provides a computer-readable storage medium. The computer-readable storage medium includes a computer program. When the computer program is run on an electronic device, the electronic device is enabled to perform the technical solution according to the second aspect or any possible design of the second aspect.

According to a sixth aspect, an embodiment of this application provides a computer program. The computer program includes instructions. When the instructions are run on a computer, the computer is enabled to perform the technical solution according to the second aspect or any possible design of the second aspect.

According to a seventh aspect, an embodiment of this application provides a graphical user interface on an electronic device. The electronic device has a display, one or more memories, and one or more processors. The one or more processors are configured to execute one or more computer programs stored in the one or more memories. The graphical user interface includes a graphical user interface displayed when the electronic device performs the technical solution according to the second aspect or any possible design of the second aspect.

For beneficial effects of the second aspect to the seventh aspect, refer to the beneficial effects of the first aspect. Details are not described again.

BRIEF DESCRIPTION OF DRAWINGS

FIG. 4A is a schematic diagram of an application stack corresponding to an in-vehicle infotainment system according to an embodiment of this application;

FIG. 4B is a schematic diagram of another application stack corresponding to an in-vehicle infotainment system according to an embodiment of this application;

FIG. 5A-1 to FIG. 5A-3 are a schematic diagram of in-vehicle infotainment system interfaces according to an embodiment of this application;

FIG. 5B-1 to FIG. 5B-5 are a schematic diagram of mobile phone interfaces according to an embodiment of this application;

DESCRIPTION OF EMBODIMENTS

Figure 1:
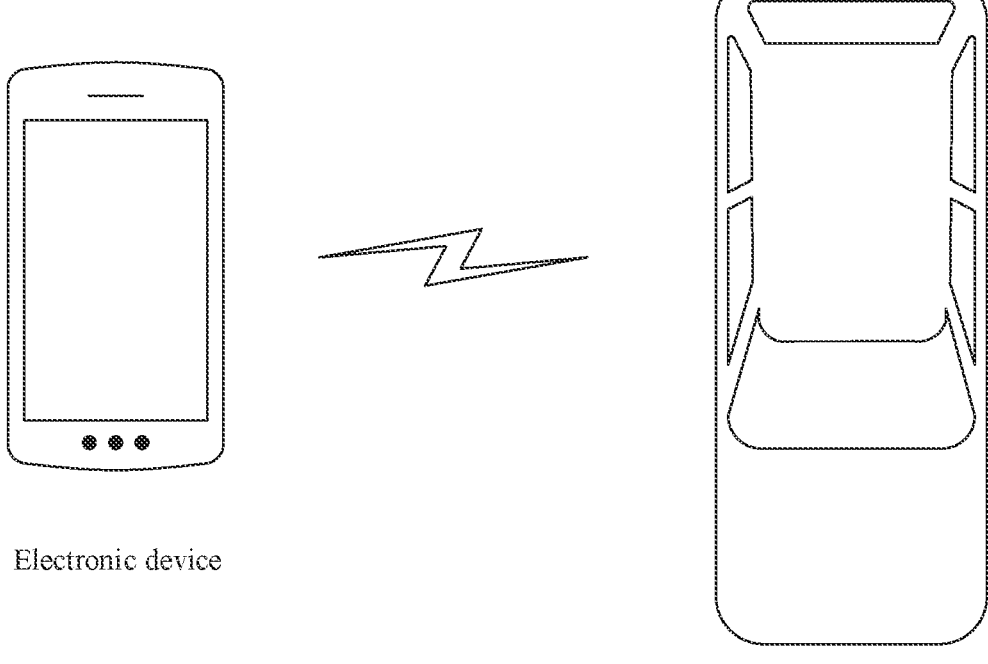
FIG. 1 is a schematic diagram of an architecture of a system according to an embodiment of this application.

An in-vehicle system such as HiCar is an application that can map an application installed on a mobile phone to an in-vehicle infotainment system. Specifically, after the mobile phone is successfully connected to the in-vehicle infotainment system, the application (such as Phone, Map, or Music) installed on the mobile phone may be mapped to the in-vehicle infotainment system. Therefore, an icon of the application installed on the mobile phone may be displayed on the in-vehicle infotainment system. In this way, a user can use, through the in-vehicle infotainment system, a service provided by the application installed on the mobile phone. It is not only convenient for the user to make a call, navigate, listen to music, or the like during driving, but also helpful to improve driving security of the user.

In some embodiments, the in-vehicle system can map some applications installed on the mobile phone to the in-vehicle infotainment system. For example, these applications are selected by the mobile phone from all applications installed on the mobile phone. For example, the mobile phone selects, with reference to settings of the user, these applications from all applications installed on the mobile phone.

However, although the in-vehicle system can map the application installed on the mobile phone to the in-vehicle infotainment system, an interface of a same application, especially a third-party application, cannot be simultaneously displayed on the in-vehicle infotainment system and the mobile phone. In this case, the user can perform an operation only on the in-vehicle infotainment system to use the service provided by the application installed on the mobile phone. This is prone to inconvenience to the user. For example, it is inconvenient for a user in a back seat to operate the in-vehicle infotainment system due to a positional relationship. For another example, the operation performed by the user on the in-vehicle infotainment system may be cumbersome. This is also prone to inconvenience to the user.

In view of this, an embodiment of this application provides a display method, so that after a mobile phone is successfully connected to an in-vehicle infotainment system, an interface of a same application, especially a third-party application, can be simultaneously displayed on the in-vehicle infotainment system and the mobile phone. Therefore, a user cannot only perform an operation on the in-vehicle infotainment system to enable the in-vehicle infotainment system to provide a corresponding service for the application, but also perform an operation on the mobile phone to enable the in-vehicle infotainment system to provide a corresponding service for the application. This facilitates use by the user.

For example, the application is Baidu Maps. A user in a back seat may perform an operation on an interface of Baidu Maps displayed on the mobile phone, so that the in-vehicle infotainment system displays a corresponding interface of Baidu Maps. This facilitates operation and control of the in-vehicle infotainment system by the user in the back seat. A user in a front seat may directly perform an operation on the interface of Baidu Maps displayed on the in-vehicle infotainment system, so that the in-vehicle infotainment system displays the corresponding interface of Baidu Maps.

It should be understood that "at least one" in embodiments of this application means one or more. "A plurality of" means two or more. "And/or" describes an association relationship between associated objects, and indicates that three relationships may exist. For example, A and/or B may represent the following three cases: Only A exists, both A and B exist, and only B exists. A and B may be singular or plural. The character "/" usually indicates an "or" relationship between associated objects. "At least one of the following pieces (items)" or a similar expression thereof indicates any combination of these items, including a single item (piece) or any combination of a plurality of items (pieces). For example, at least one of a, b, or c may represent seven cases: a, b, c, a and b, a and c, b and c, and a, b, and c. Each of a, b, and c may be an element, or may be a set including one or more elements.

In this application, "example", "in some embodiments", "in some other embodiments", or the like is used to represent giving an example, an illustration, or a description. Any embodiment or design scheme described as an "example" in this application should not be explained as being more preferred or having more advantages than another embodiment or design scheme. Exactly, the word "example" is used to present a concept in a specific manner.

It should be noted that in embodiments of this application, terms such as "first" and "second" are merely used for a purpose of distinction in description, and should not be understood as an indication or implication of relative importance or an indication or implication of a sequence.

FIG. 1 is a diagram of an architecture of a system according to an embodiment of this application. The system includes an electronic device and a vehicle-mounted device. Both the electronic device and the vehicle-mounted device support an in-vehicle system. It should be noted that the in-vehicle system may be installed before the electronic device is delivered from a factory, or may be installed by a user according to a requirement of the user. This is not limited. For example, the electronic device in embodiments of this application may be a portable terminal, such as a mobile phone, a tablet computer, a notebook computer, or a wearable device (for example, a smartwatch). For example, an operating system that the portable terminal runs includes but is not limited to iOS®, Android®, Windows®, or the like. In addition, the electronic device in embodiments of this application is not limited to the portable terminal, for example, a vehicle-mounted terminal. The vehicle-mounted device in embodiments of this application may be an in-vehicle infotainment system or the like. This is not limited.

Figure 2:
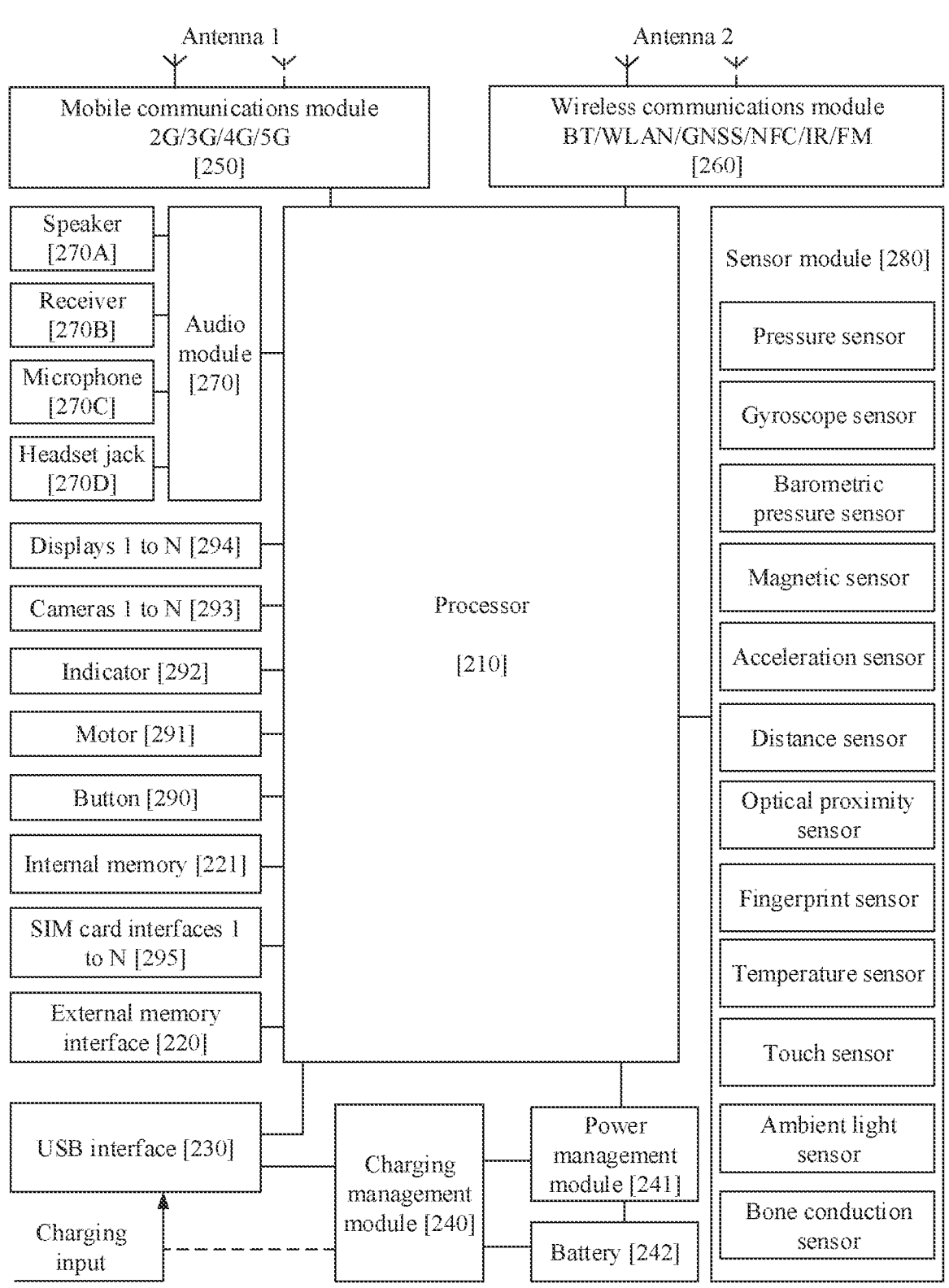
FIG. 2 is a schematic diagram of a hardware structure of a mobile phone according to an embodiment of this application.

For example, the electronic device is a mobile phone. For example, FIG. 2 is a schematic diagram of a hardware structure of a mobile phone according to an embodiment of this application. Specifically, as shown in the figure, the mobile phone includes a processor 210, an external memory interface 220, an internal memory 221, a universal serial bus (universal serial bus, USB) interface 230, a charging management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a button 290, a motor 291, an indicator 292, a camera 293, a display 294, a subscriber identity module (subscriber identity module, SIM) card interface 295, and the like. The sensor module 280 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

The processor 210 may include one or more processing units. For example, the processor 210 may include an application processor (application processor, AP), a modem (modem), a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or two or more different processing units may be integrated into one component.

A memory may be further disposed in the processor 210, and is configured to store a computer program and/or data. In some embodiments, the memory in the processor 210 is a cache. The memory may store a computer program and/or data just used or cyclically used by the processor 210. If the processor 210 needs to use the computer program and/or the data again, the computer program and/or the data may be directly called from the memory. This avoids repeated access, reduces waiting time of the processor 210, and improves system efficiency.

In some embodiments, the processor 210 may include one or more interfaces. For example, the processor 210 includes the universal serial bus (universal serial bus, USB) interface 230 and the subscriber identity module (subscriber identity module, SIM) card interface 295. For another example, the processor 210 may further include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, and/or the like.

It may be understood that an interface connection relationship between the modules shown in FIG. 2 is merely an example for description, and does not constitute a limitation on a structure of the electronic device. In some other embodiments of this application, the mobile phone may alternatively use an interface connection manner different from that shown in FIG. 2. For example, the modules are connected through a bus.

The charging management module 240 is configured to receive a charging input from a charger. The charger may be a wireless charger or a wired charger. In some embodiments of wired charging, the charging management module 240 may receive a charging input of a wired charger through the USB interface 230. In some embodiments of wireless charging, the charging management module 240 may receive a wireless charging input through a wireless charging coil of the mobile phone. The charging management module 240 may further supply power to the mobile phone by using the power management module 241 while charging the battery 242.

The power management module 241 is configured to connect to the battery 242, the charging management module 240, and the processor 210. The power management module 241 receives an input of the battery 242 and/or the charging management module 240, and supplies power to the processor 210, the internal memory 221, an external memory, the display 294, the camera 293, the wireless communications module 260, and the like. The power management module 241 may further be configured to monitor parameters such as a battery capacity, a battery cycle count, and a battery health status (electric leakage or impedance). In some other embodiments, the power management module 241 may alternatively be disposed in the processor 210. In some other embodiments, the power management module 241 and the charging management module 240 may alternatively be disposed in a same device.

A wireless communication function of the mobile phone may be implemented through the antenna 1, the antenna 2, the mobile communications module 250, the wireless communications module 260, the modem, the baseband processor, and the like.

The antenna 1 and the antenna 2 are configured to transmit and receive electromagnetic wave signals. Each antenna in the mobile phone may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 250 may provide a wireless communication solution that is applied to the mobile phone and that includes a standard such as 2G, 3G, 4G, or 5G. The mobile communications module 250 may include at least one filter, a switch, a power amplifier, a low noise amplifier (low noise amplifier, LNA), and the like.

The wireless communications module 260 may provide a wireless communication solution that is applied to the mobile phone and that includes a wireless local area network (wireless local area network, WLAN) (for example, a Wi-Fi network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like.

In some embodiments, in the mobile phone, the antenna 1 and the mobile communications module 250 are coupled, and the antenna 2 and the wireless communications module 260 are coupled, so that the mobile phone can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS), and/or a satellite based augmentation system (satellite based augmentation system, SBAS).

The GPU of the mobile phone, the display 294, the application processor, and the like implement a display function. The display 294 is configured to display an image, a video, or the like. The display 294 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flexible light-emitting diode, FLED), a mini-LED, a micro-LED, a micro-OLED, a quantum dot light-emitting diode (quantum dot light emitting diode, QLED), or the like. In some embodiments, the mobile phone may include 1 or N displays 294, where N is a positive integer greater than 1.

The mobile phone may implement a photographing function by using the ISP, the camera 293, the video codec, the GPU, the display 294, the application processor, and the like. The camera 293 is configured to capture a static image or a video. An optical image of an object is generated through a lens, and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the mobile phone may include 1 or N cameras 293, where N is a positive integer greater than 1.

The external memory interface 220 may be configured to connect to an external memory card, for example, a micro SD card, to extend a storage capability of the mobile phone. The external memory card communicates with the processor 210 through the external memory interface 220, to implement a data storage function. For example, a file such as music or a video is stored in the external memory card.

The internal memory 221 includes a running memory (memory) and a built-in memory. The running memory may be configured to store a computer program, data, and/or the like. The processor 210 executes various functional applications of the mobile phone and processes data by running the computer program stored in the running memory. For example, the running memory may include a high speed random access memory. The built-in memory may also be referred to as a built-in external memory or the like, and may be configured to store a computer program and/or data. For example, the built-in memory may store an operating system, an application, and the like. The mobile phone usually loads the computer program and/or data in the built-in memory to the running memory, so that the processor 210 runs a corresponding computer program and/or data to implement a corresponding function. In addition, the internal memory 221 may include a nonvolatile memory, for example, at least one magnetic disk storage device, a flash memory, and a universal flash storage (universal flash storage, UFS).

The mobile phone uses the audio module 270, the speaker 270A, the receiver 270B, the microphone 270C, the headset jack 270D, the application processor, and the like to implement an audio function, such as music playing or recording.

The button 290 includes a power button, a volume button, or the like. The button 290 may be a mechanical button or a touch button. The mobile phone may receive button input, and generate button signal input related to user settings and function control of the mobile phone.

The motor 291 may generate a vibration prompt. The motor 291 may be configured to provide an incoming call vibration prompt and touch vibration feedback. For example, touch operations performed on different applications (for example, photographing and audio playing) may correspond to different vibration feedback effects. The motor 291 may also generate different vibration feedback effects for touch operations performed on different areas of the display 294. Different application scenarios (for example, a time reminder, information receiving, an alarm clock, and a game) may alternatively correspond to different vibration feedback effects. A touch vibration feedback effect may be further customized.

The indicator 292 may be an indicator light, and may be configured to indicate a charging status and a power change, or may be configured to indicate a message, a missed call, a notification, and the like.

It may be understood that a structure shown in this embodiment of this application does not constitute a specific limitation on the mobile phone. In some other embodiments of this application, the mobile phone may include more or fewer components than those shown in the figure, have some components combined, have some components split, or have different component arrangements. The components shown in the figure may be implemented by using hardware, software, or a combination of software and hardware.

The following describes embodiments of this application in detail by using an in-vehicle infotainment system and a mobile phone having a hardware structure shown in FIG. 2 as an example.

Figure 3:
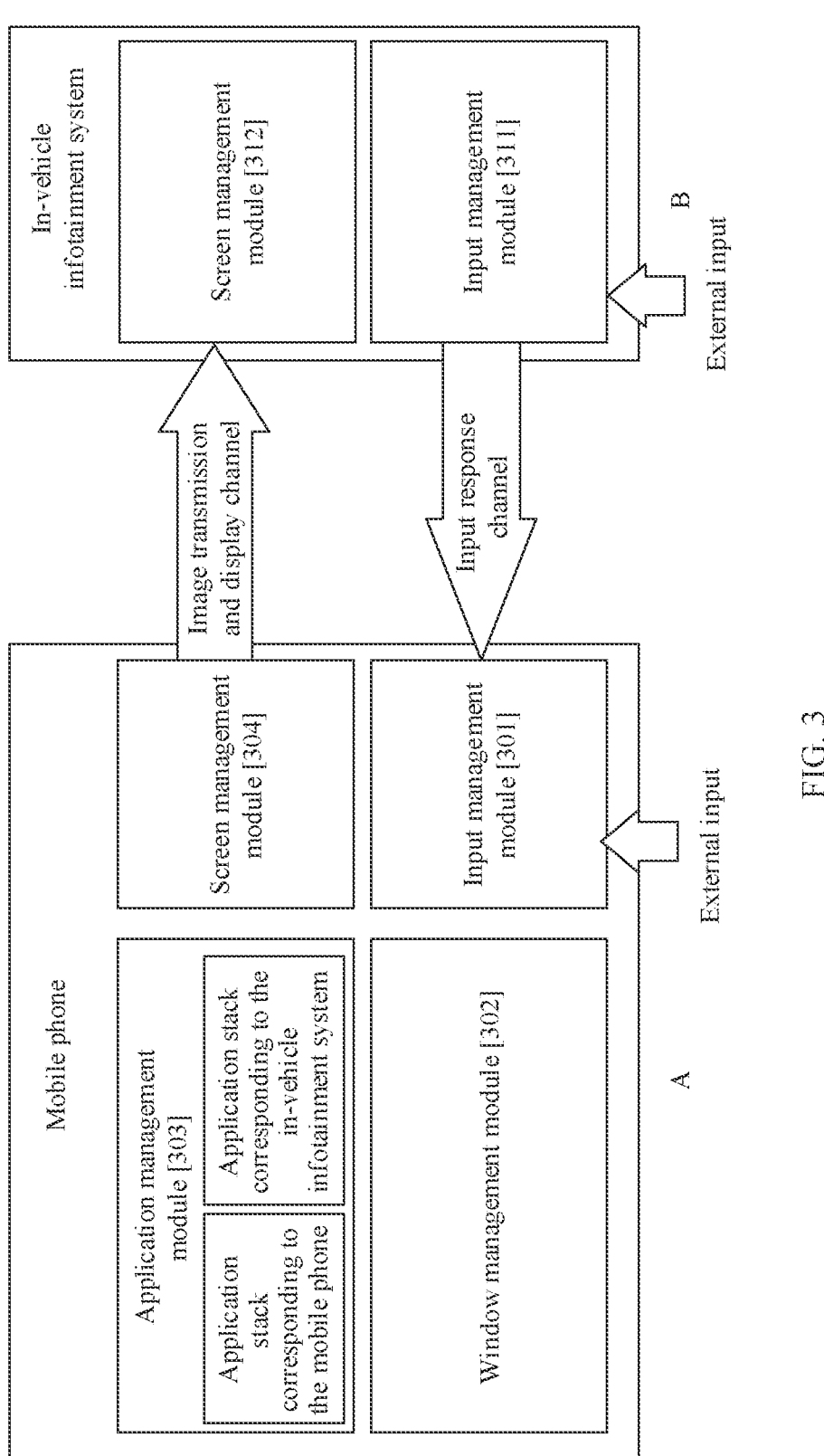
FIG. 3 is a schematic diagram of a software structure of a mobile phone according to an embodiment of this application.

A in FIG. 3 is a schematic diagram of a software structure of a mobile phone. As shown in the figure, the mobile phone includes an input management module 301, a window management module 302, an application management module 303, and a screen management module 304. B in FIG. 3 is a schematic diagram of a software structure of an in-vehicle infotainment system. As shown in the figure, the in-vehicle infotainment system includes an input management module 311 and a screen management module 312.

The input management module 301 is configured to receive external input, identify a source (the in-vehicle infotainment system or the mobile phone) of the external input, and analyze a user operation of the external input. For example, the external input may be an operation performed by a user on the mobile phone or an operation performed by the user on the in-vehicle infotainment system. For example, when an interface is displayed on a display of the mobile phone, the operation performed by the user on the mobile phone may be a gesture operation performed by the user on the interface displayed on the display of the mobile phone, or an operation performed by the user on a button (for example, a volume button) of the mobile phone. For another example, when an interface is displayed on a display of the in-vehicle infotainment system, the operation performed by the user on the in-vehicle infotainment system may be a gesture operation performed by the user on the interface displayed on the display of the in-vehicle infotainment system, an operation performed on a physical button of the in-vehicle infotainment system, or the like. This is not limited. It should be noted that when the external input is the operation performed by the user on the mobile phone, the source of the external input is the mobile phone. When the external input is the operation performed by the user on the in-vehicle infotainment system, the source of the external input is the in-vehicle infotainment system.

The window management module 302 is responsible for an interface layout. For example, the window management module 302 may lay out interface elements of an application based on a size, a resolution, a landscape/portrait mode, and the like of the display of the in-vehicle infotainment system to obtain an interface of the application displayed on the in-vehicle infotainment system. It is ensured that the interface can be normally displayed on the in-vehicle infotainment system. For another example, the window management module 302 may also lay out interface elements of an application based on a size, a resolution, a landscape/portrait mode, and the like of the display of the mobile phone to obtain an interface of the application displayed on the mobile phone. For ease of description below, the interface of the application displayed on the mobile phone is briefly referred to as a mobile phone interface of the application, and the interface of the application displayed on the in-vehicle infotainment system is briefly referred to as an in-vehicle infotainment system interface of the application.

The application management module 303 is responsible for managing an application stack corresponding to the mobile phone and an application stack corresponding to the in-vehicle infotainment system. Therefore, the in-vehicle infotainment system and the mobile phone can simultaneously display the interface of the same application. In other words, the in-vehicle infotainment system displays the in-vehicle infotainment system interface of the application, and the mobile phone displays the mobile phone interface of the application. The application stack corresponding to the mobile phone is used to store mobile phone interfaces of all applications installed on the mobile phone. The application stack corresponding to the in-vehicle infotainment system is used to store in-vehicle infotainment system interfaces of one or more applications installed on the mobile phone. Further, in some embodiments, the application stack corresponding to the in-vehicle infotainment system may include a plurality of application stacks. Each application stack corresponds to one application. In other words, an application stack corresponding to one application is used to store an in-vehicle infotainment system interface of the application. For example, the applications installed on the mobile phone are an application 1, an application 2, and an application 3. For example, the application stack corresponding to the mobile phone is used to store a mobile phone interface of the application 1, a mobile phone interface of the application 2, and a mobile phone interface of the application 3. The application stack corresponding to the in-vehicle infotainment system is used to store an in-vehicle infotainment system interface of the application 1, art in-vehicle infotainment system interface of the application 2, and an in-vehicle infotainment system interface of the application 3. For example, the application stack corresponding to the in-vehicle infotainment system may be shown in FIG. 4A. For another example, the application stack corresponding to the in-vehicle infotainment system may be shown in FIG. 4B, and includes an application stack 1 and an application stack 2. The application stack 1 corresponds to the application 1, and is used to store in-vehicle infotainment system interfaces of the application 1. The application stack 2 corresponds to the application 2, and is used to store in-vehicle infotainment system interfaces of the application 2. As shown in FIG. 4B, the application stack 1 includes an in-vehicle infotainment system interface 1 of the application 1 and an in-vehicle infotainment system interface 2 of the application 1. The application stack 2 includes an in-vehicle infotainment system interface 1 of the application 2 and an in-vehicle infotainment system interface 2 of the application 2. When different applications in the application stack corresponding to the in-vehicle infotainment system correspond to different application stacks, the in-vehicle infotainment system can simultaneously display in-vehicle infotainment system interfaces of the different applications.

The screen management module 304 is responsible for controlling interface display. For example, the screen management module 304 controls the interface display based on the source of the external input. For example, if the external input is that the user starts Baidu Maps on the in-vehicle infotainment system the screen management module 304 controls an in-vehicle infotainment system interface of Baidu Maps to be displayed on the in-vehicle infotainment system. For another example, if the external input is that the user starts Baidu Maps on the mobile phone, the screen management module 304 controls a mobile phone interface of Baidu Maps to be displayed on the mobile phone.

The input management module 311 is configured to receive external input, and send the external input to the input management module 301. The input management module 301 identifies the external input from the input management module 311, and analyzes a user operation of the external input from the input management module 311.

Alternatively, the input management module 311 is configured to receive external input, analyze the external input, and then send an analysis result to the input management module 301. The analysis result is used to indicate a user operation and a source. In this way, the input management module 301 does not need to identify the source and analyze the user operation of the external input from the input management module 311. This helps reduce a computation amount of the mobile phone.

The screen management module 312 is responsible for displaying an in-vehicle infotainment system interface. The screen management module 312 receives the in-vehicle infotainment system interface from the mobile phone, and displays the in-vehicle infotainment system interface on the display of the in-vehicle infotainment system.

In addition, in some embodiments, an input response channel and an image transmission and display channel may be included between the in-vehicle infotainment system and the mobile phone. The in-vehicle infotainment system may send, to the mobile phone through the input response channel, the external input received by the in-vehicle infotainment system. The mobile phone may send an in-vehicle infotainment system interface of a corresponding application to the in-vehicle infotainment system through the image transmission and display channel. For example, the input response channel and the image transmission and display channel between the in-vehicle infotainment system and the mobile phone may be established when the mobile phone is connected to the in-vehicle infotainment system, or may be established after a connection between the mobile phone and the in-vehicle infotainment system is successfully established.

For example, the mobile phone and the in-vehicle infotainment system may be connected in a wired manner. For example, the mobile phone and the in-vehicle infotainment system are connected through a data cable. For another example, the mobile phone and the in-vehicle infotainment system may alternatively be connected in a wireless manner. For example, the mobile phone and the in-vehicle infotainment system may be connected based on Bluetooth, Wi-Fi, or the like. This is not limited in embodiments of this application.

A display method in embodiments of this application is described by using an example in which an in-vehicle system supported by an in-vehicle infotainment system and a mobile phone is HiCar.

Figures 1, 2, 5A:
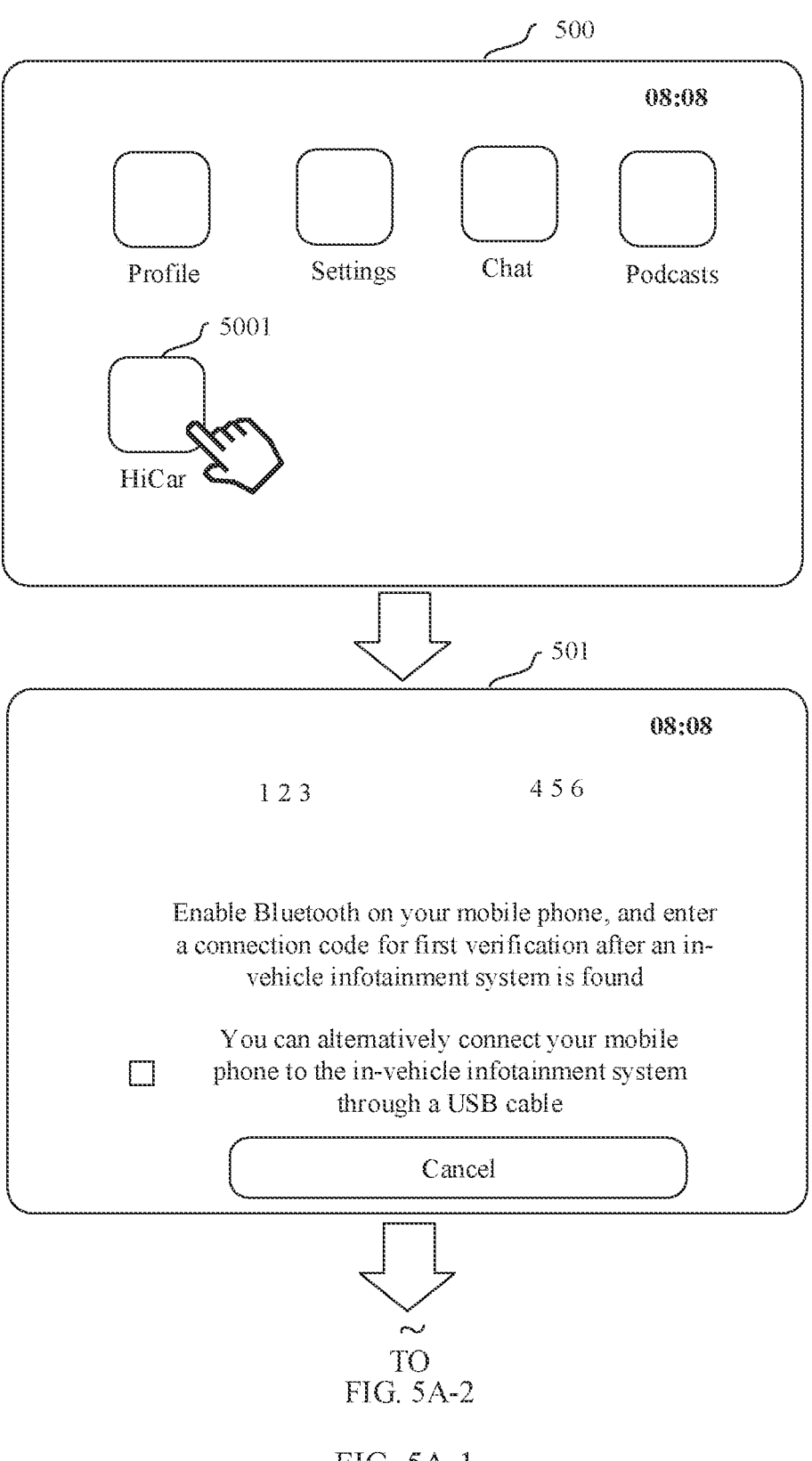
Figures 2, 5A:
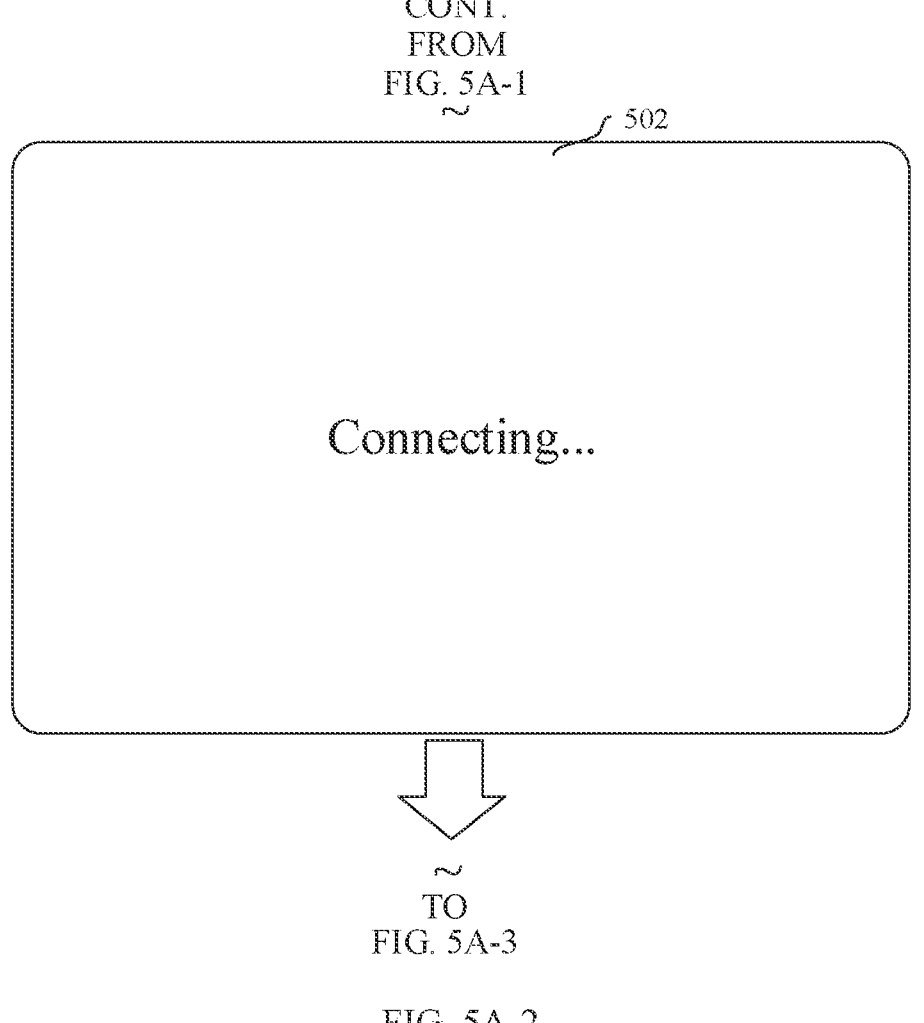
Figures 3, 5A:
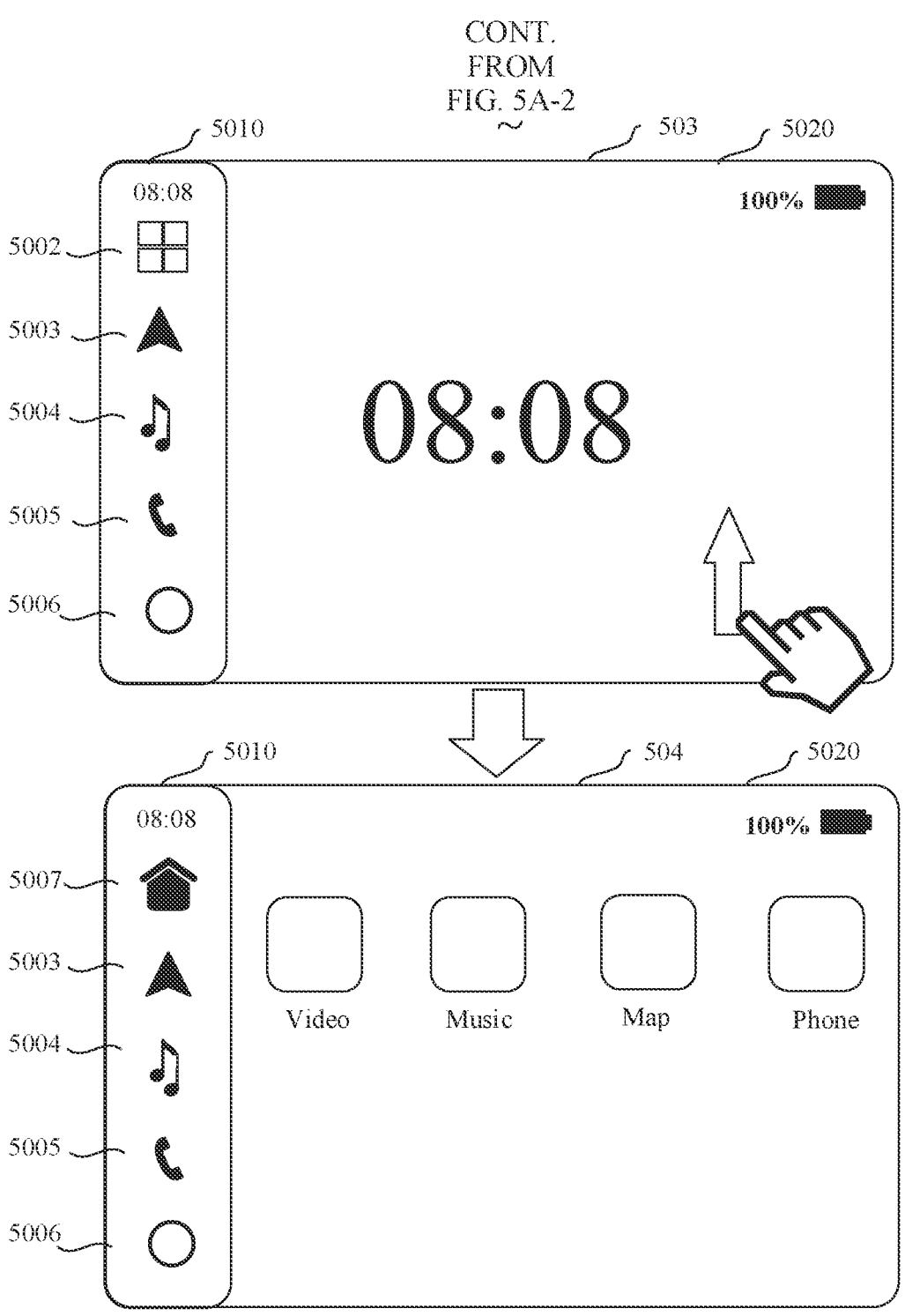
Figures 1, 5B:
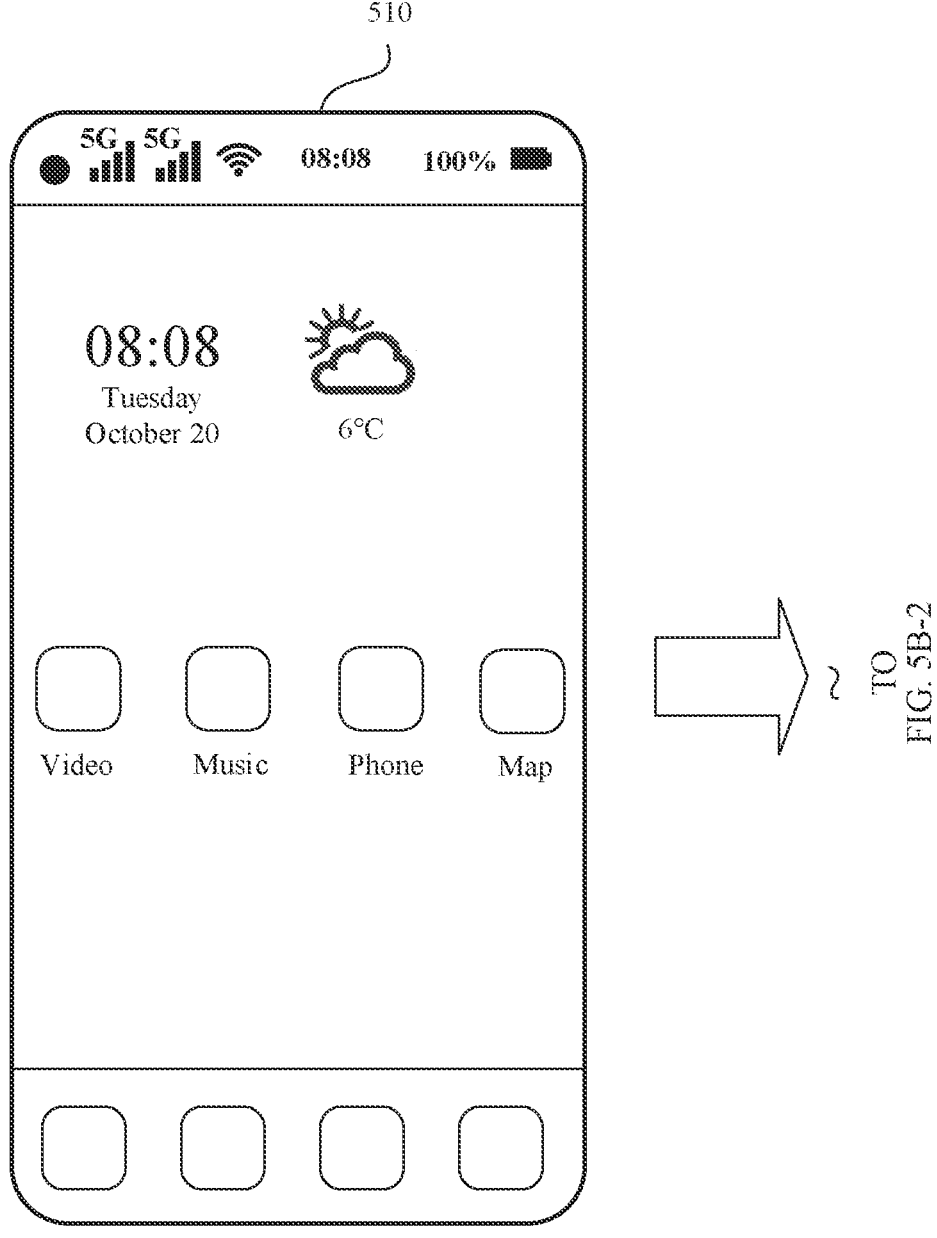
Figures 1, 2, 3, 5B:
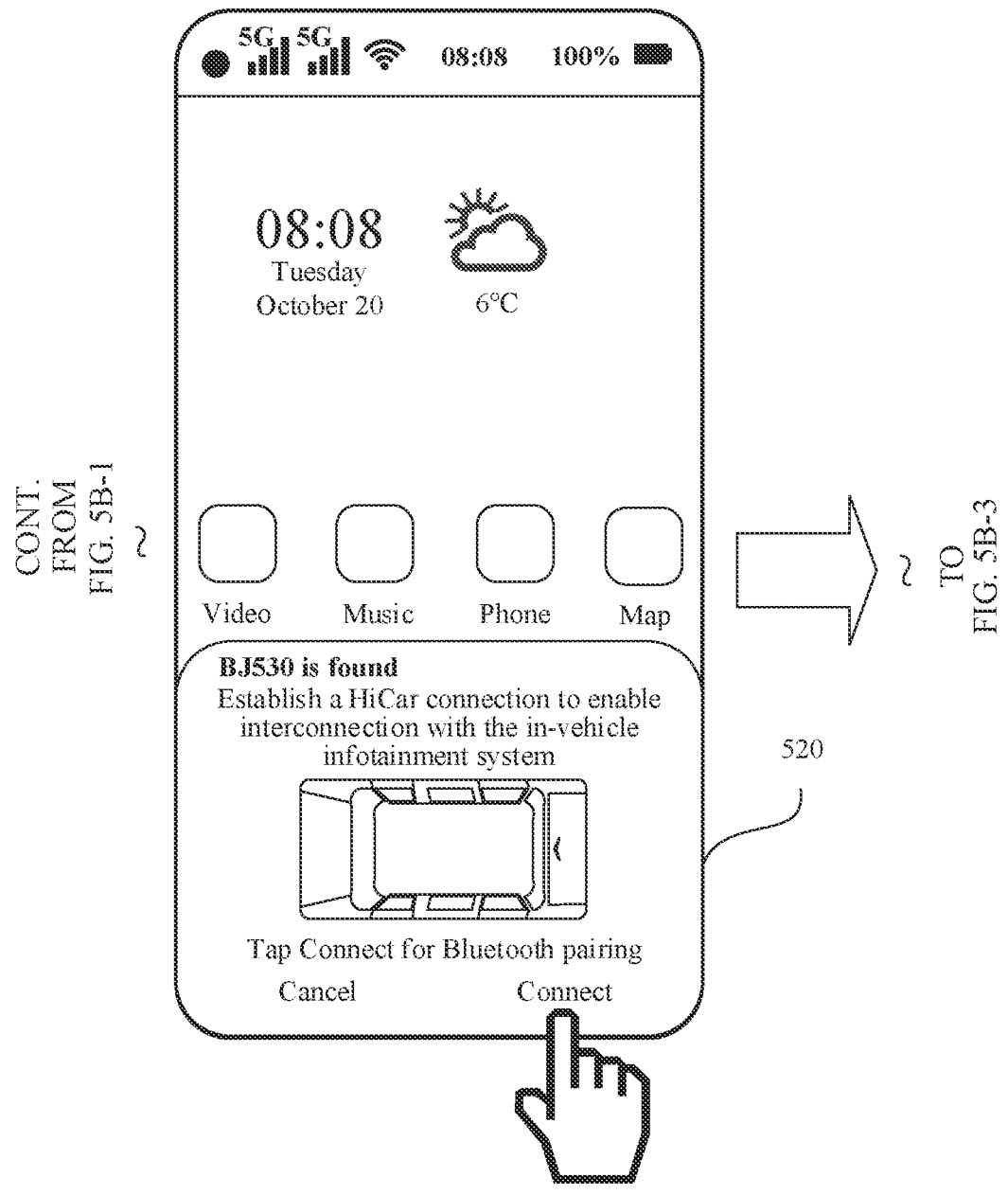
Figures 2, 3, 4, 5B:
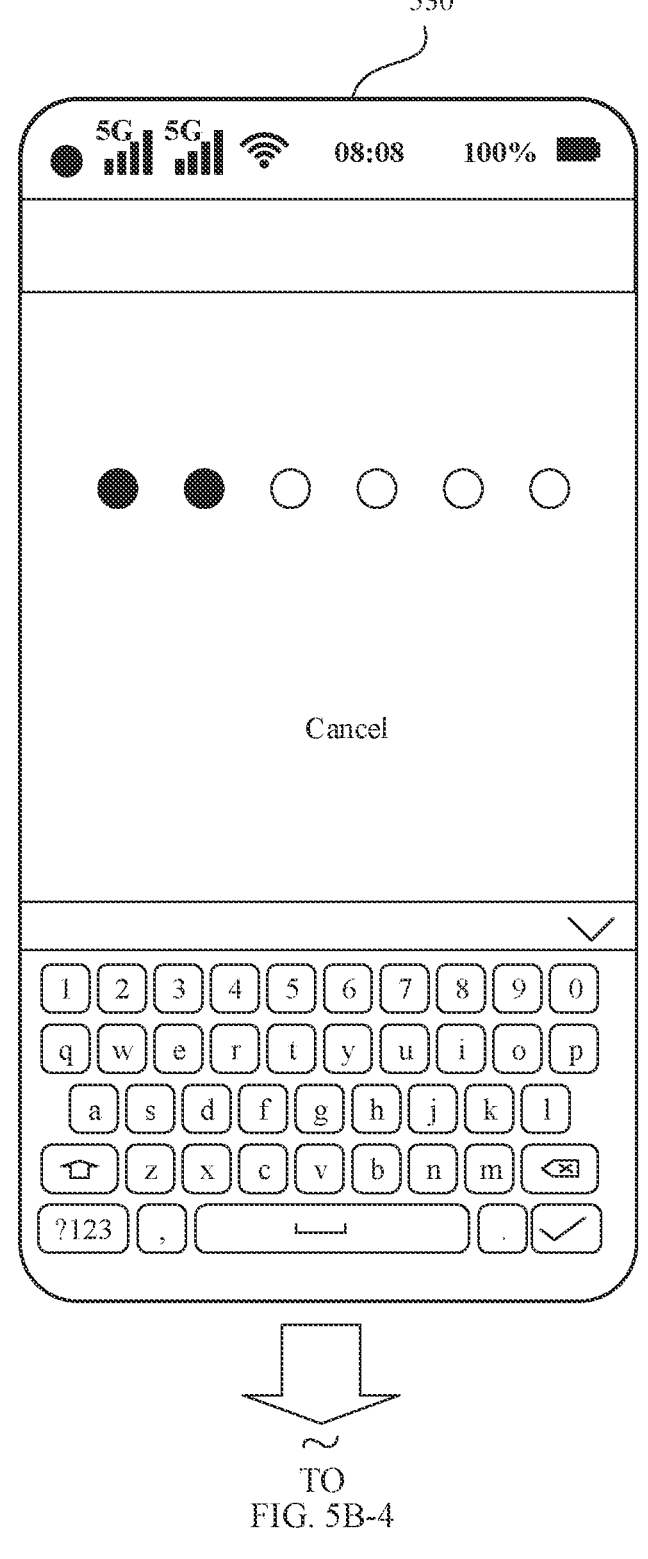
Figures 3, 4, 5, 5B:
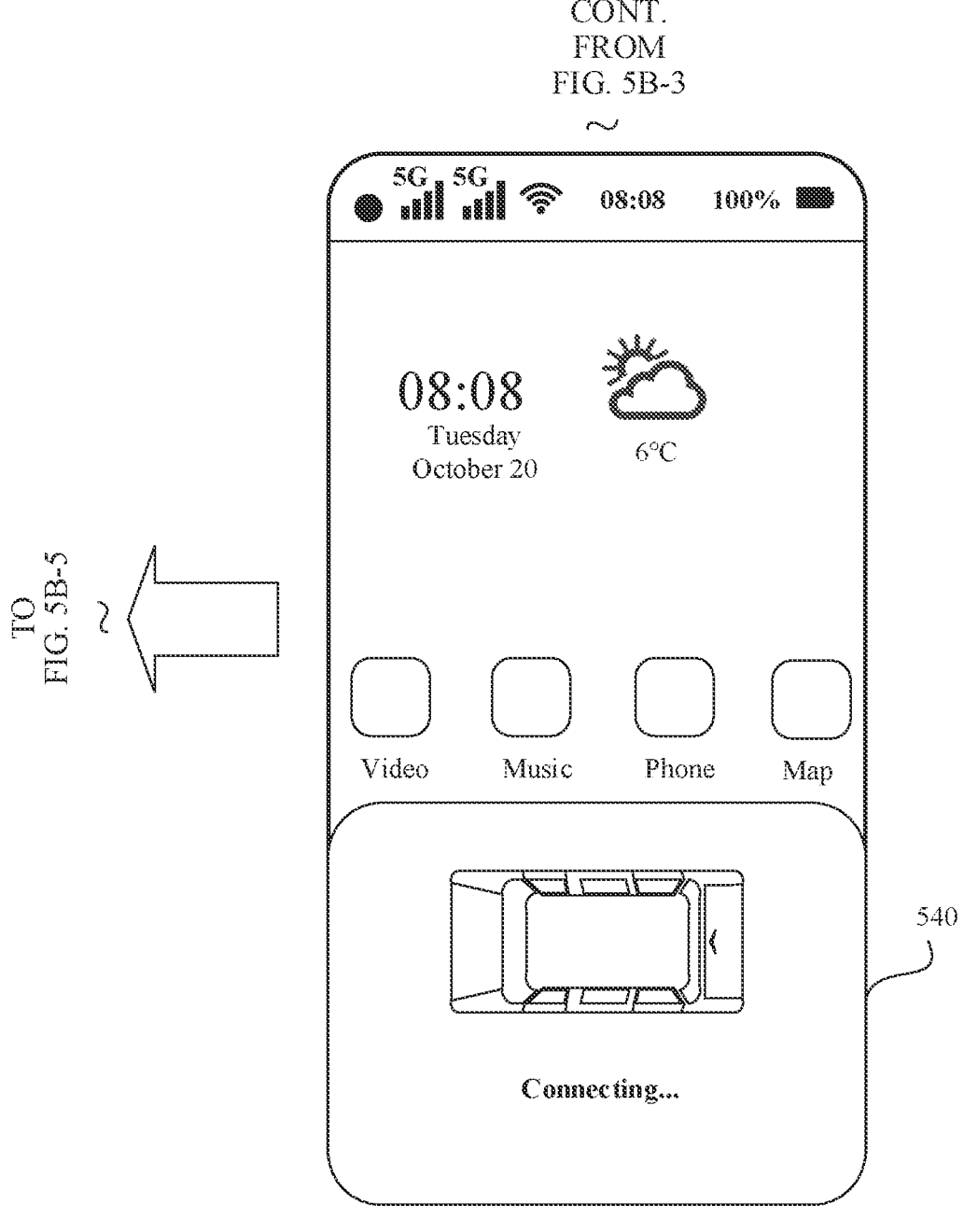
Figures 4, 5, 5B:
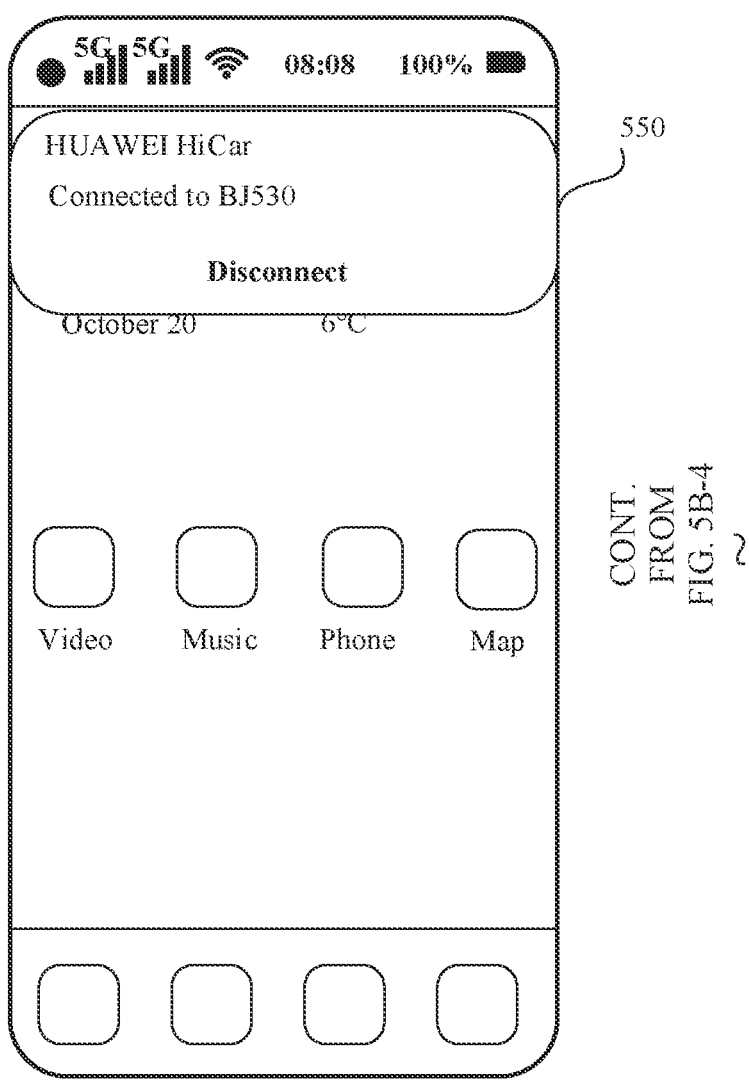

As shown in FIG. 5A-1, the in-vehicle infotainment system displays an interface 500. The interface 500 includes an icon of an application installed on the in-vehicle infotainment system. For example, an icon 5001 is used to identify HiCar. The in-vehicle infotainment system sends a broadcast message and displays an interface 501 in response to tapping the icon 5001 by a user. For example, the broadcast message includes a name or an identifier of the in-vehicle infotainment system. The interface 501 includes a verification code 123456. In some embodiments, the interface 501 may further include a "Cancel" option. In response to tapping the "Cancel" option by the user, the in-vehicle infotainment system is stopped from continuing to establish a connection to the mobile phone. An example in which an in-vehicle infotainment system name included in the broadcast message is BJ530 is used. When displaying an interface 510 shown in FIG. 5B-1, the mobile phone receives the broadcast message from the in-vehicle infotainment system, and displays a prompt box 520. The prompt box 520 is used to prompt the user that the in-vehicle infotainment system named BJ530 is found. The prompt box 520 further includes a "Cancel" option and a "Connect" option. The mobile phone displays an interface 530 in response to tapping the "Connect" option by the user. The interface 530 is used by the user to enter a verification code. The mobile phone sends a connection establishment request to the in-vehicle infotainment system and displays a prompt box 540 in response to completion of entering the verification code on the interface 530. The connection establishment request includes the verification code entered by the user. The prompt box 540 is used to prompt the user that a connection is being established between the mobile phone and the in-vehicle infotainment system. The in-vehicle infotainment system receives the connection establishment request from the mobile phone, and displays an interface 502. The interface 502 is used to prompt the user that the connection is being established between the in-vehicle infotainment system and the mobile phone. When displaying the interface 502, the in-vehicle infotainment system further determines whether the verification code in the connection establishment request is the same as the verification code included in the interface 501. If they are the same, the connection between the in-vehicle infotainment system and the mobile phone is successfully established, and the in-vehicle infotainment system sends a connection establishment success response to the mobile phone. After receiving the connection establishment success response, the in-vehicle infotainment system maps the application installed on the in-vehicle infotainment system to the in-vehicle infotainment system, and displays a prompt box 550. The prompt box 550 is used to prompt the user that the mobile phone is connected to the in-vehicle infotainment system. In some embodiments, the prompt box 550 further includes a "Disconnect" option. The user may tap the "Disconnect" option to disconnect the mobile phone from the in-vehicle infotainment system. After the mobile phone maps the application installed on the mobile phone to the in-vehicle infotainment system, the in-vehicle infotainment system may display a navigation bar in an area 5010, and display a current time in an area 5020, as shown in an interface 503 in FIG. 5A-3. In response to an upward sliding operation performed by the user on the area 5020 of the interface 503, the in-vehicle infotainment system displays, in the area 5020, an icon of the application mapped from the mobile phone to the in-vehicle infotainment system. For example, a video application, a music application, a map application, and a phone application are mapped from the mobile phone to the in-vehicle infotainment system. The in-vehicle infotainment system displays an icon of the video application, an icon of the music application, an icon of the map application, and an icon of the phone application in the area 5020 in response to the upward sliding operation performed by the user on the area 5020 of the interface 503. In this way, the in-vehicle infotainment system is successfully connected to the mobile phone in a wireless manner.

Further, in some embodiments, content in the navigation bar may change in response to the upward sliding operation performed by the user on the area 5020. For example, the navigation bar in the interface 503 includes the current time, an icon 5002, an icon 5003, an icon 5004, an icon 5005, and an icon 5006. The navigation bar in an interface 504 includes the current time, an icon 5007, the icon 5003, the icon 5004, the icon 5005, and the icon 5006. For example, the icon 5002 is used to control the icon of the application mapped from the mobile phone to the in-vehicle infotainment system to be displayed in the area 5020. The icon 5003 is used by the user to start map navigation. The icon 5004 is used by the user to start the music application. The icon 5005 is used by the user to quickly make a call. The icon 5006 is used to start a voice assistant. The icon 5007 is used to control the current time to be displayed in the area 5020. It should be noted that the content in the navigation bar may not change in response to the upward sliding operation performed by the user on the area 5020. The foregoing is merely an example for describing the content included in the navigation bar. A quantity of icons included in the navigation bar and/or functions of the icons are/is not limited in this embodiment of this application.

It should be noted that in some other embodiments, after the mobile phone maps the application installed on the mobile phone to the in-vehicle infotainment system, the in-vehicle infotainment system may directly display the interface 504 in FIG. 5A-3, without displaying the interface 503. For example, in response to a downward sliding operation performed by the user, the in-vehicle infotainment system switches from the interface 504 to the interface 503 for display.

Figure 5C:
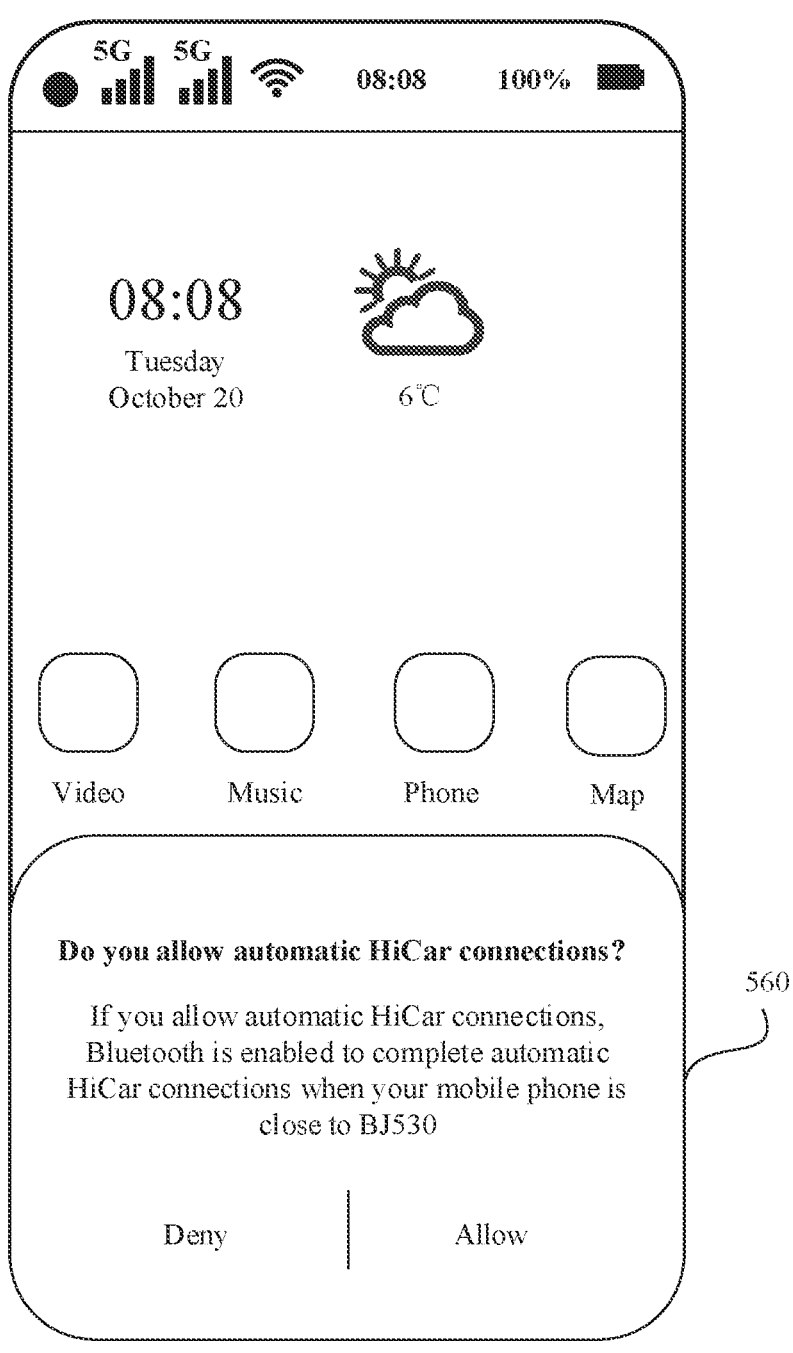
FIG. 5C is a schematic diagram of another mobile phone interface according to an embodiment of this application.

Based on the process of establishing the connection between the in-vehicle infotainment system and the mobile phone shown in FIG. 5A-1 to FIG. 5A-3, in still some embodiments, when the mobile phone is connected to the in-vehicle infotainment system for the first time, the mobile phone may send the connection establishment request to the in-vehicle infotainment system and display a prompt box 560 shown in FIG. 5C in response to the completion of entering the verification code on the interface 530. After the user taps an "Allow" option in the prompt box 560, the mobile phone displays the prompt box 540 shown in FIG. 5B-4. The prompt box 560 is used to prompt the user whether to allow automatic HiCar connections. The prompt box 560 further includes a "Deny" option and the "Allow" option. In response to tapping the "Allow" option by the user, when the mobile phone is connected to the in-vehicle infotainment system again, the mobile phone may be automatically connected to the in-vehicle infotainment system after discovering the in-vehicle infotainment system named BJ530, without performing steps in which the user taps the "Connect" option in the prompt box 520 and enters the verification code on the interface 530. In this way, user operations are reduced.

Certainly, the foregoing is merely an example of implementing the connection between the mobile phone and the in-vehicle infotainment system, and does not constitute a limitation on the connection between the mobile phone and the in-vehicle infotainment system. In this embodiment of this application, the mobile phone and the in-vehicle infotainment system may alternatively be wirelessly connected in another manner, for example, based on near field communication (near field communication, NFC) or a wireless local area network (wireless local area network, WLAN). It should be understood that in this embodiment of this application, the mobile phone and the in-vehicle infotainment system may alternatively be connected in a wired manner through a data cable (for example, a USB cable). This is not limited. In addition, in the foregoing example, the user taps the icon 5001 of HiCar on the in-vehicle infotainment system to initiate the connection. Optionally, the user may alternatively tap an icon of HiCar displayed on an interface of the mobile phone to initiate the connection between the mobile phone and the in-vehicle infotainment system.

Figures 6A, 6B:
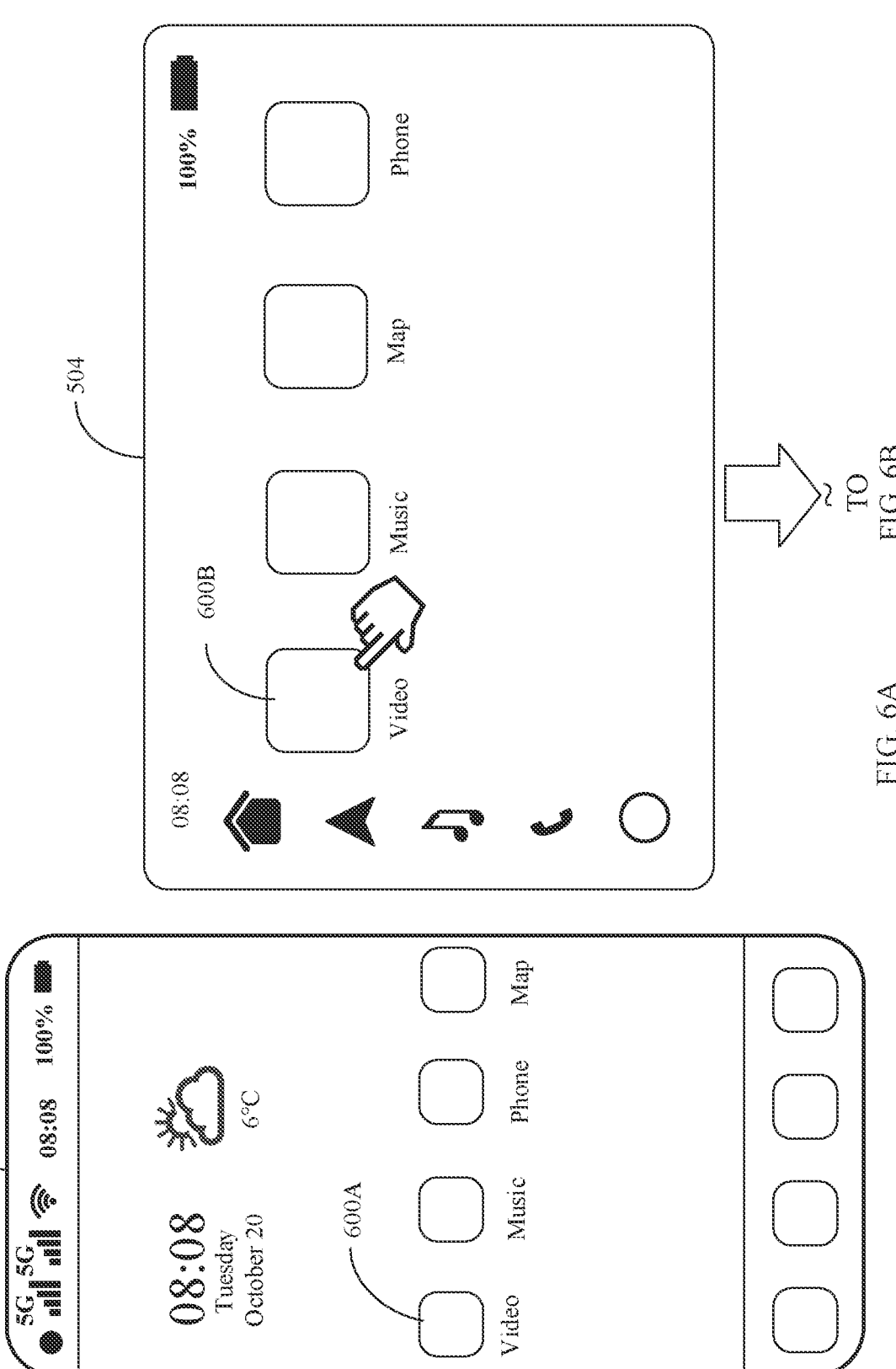
FIG. 6A to FIG. 6C are a schematic diagram of in-vehicle infotainment system interfaces and mobile phone interfaces according to an embodiment of this application.

For example, the mobile phone maps the video application, the music application, the phone application, and the map application that are installed on the mobile phone to the in-vehicle infotainment system. For example, after the mobile phone and the in-vehicle infotainment system are successfully connected, the mobile phone sends information about the video application, the music application, the phone application, and the map application to the in-vehicle infotainment system. The information about the applications may include icons, names, versions, and the like of the installed applications. After receiving the information about the applications installed on the mobile phone, the in-vehicle infotainment system may display the icons of the applications on a display of the in-vehicle infotainment system. As shown in FIG. 6A, the mobile phone displays the interface 510, and the in-vehicle infotainment system displays the interface 504. For example, the interface 510 includes an icon 600A, and the interface 504 includes an icon 600B. An application installed on the mobile phone and identified by the icon 600A and the icon 600B is the video application. When the mobile phone displays the interface 510 and the in-vehicle infotainment system displays the interface 504, the mobile phone pins an interface 610B on top of an application stack corresponding to the in-vehicle infotainment system and sends the interface 610B to the in-vehicle infotainment system in response to tapping the icon 600B by the user, so that the in-vehicle infotainment system displays the interface 610B, and the mobile phone still displays the interface 510, as shown in FIG. 6B. In some embodiments, when the application stack corresponding to the in-vehicle infotainment system includes an application stack corresponding to the video application, an application stack corresponding to the music application, an application stack corresponding to the phone application, and an application stack corresponding to the map application, the mobile phone pins the interface 610B on top of the application stack corresponding to the video application in the application stack corresponding to the in-vehicle infotainment system.

It should be noted that when the video application installed on the mobile phone has a pre-adapted in-vehicle infotainment system interface, the interface 610B is the pre-adapted in-vehicle infotainment system interface of the video application. For example, the mobile phone may determine, in response to tapping the icon 600B by the user, whether the video application has an identifier indicating that an adapted in-vehicle infotainment system interface exists. If the video application has the identifier indicating that an adapted in-vehicle infotainment system interface exists, the mobile phone pins the pre-adapted in-vehicle infotainment system interface, that is, the interface 610B, of the video application on top of the application stack corresponding to the in-vehicle infotainment system. For another example, if the video application does not have the identifier indicating that an adapted in-vehicle infotainment system interface exists, the mobile phone determines that the video application does not have a pre-adapted in-vehicle infotainment system interface, and arranges elements of a mobile phone interface (namely, the interface 610A shown in FIG. 6C) of the video application with reference to a size, a resolution, and the like of the display of the in-vehicle infotainment system to obtain the interface 610B. Therefore, the technical solutions in embodiments of this application not only can be applied to an application that has an adapted in-vehicle infotainment system interface, but also can be applied to an application that does not have an adapted in-vehicle infotainment system interface.

For an application that has an adapted in-vehicle infotainment system interface, in addition to a mobile phone interface (for example, the interface 610A, namely, an interface that is re-arranged to obtain the interface 610B) of the application, an installation package of the application includes the in-vehicle infotainment system interface (for example, 610B) of the application. After the application is installed on the mobile phone, the in-vehicle infotainment system interface of the application is stored on the mobile phone. For example, the user may download a related application from an application market, such as an application market of the in-vehicle infotainment system or an application market of the mobile phone. Optionally, all applications provided in the application market of the in-vehicle infotainment system are applications that have adapted in-vehicle infotainment system interfaces, but only some applications in the application market of the mobile phone are applications that have adapted in-vehicle infotainment system interfaces.

Figure 8A:
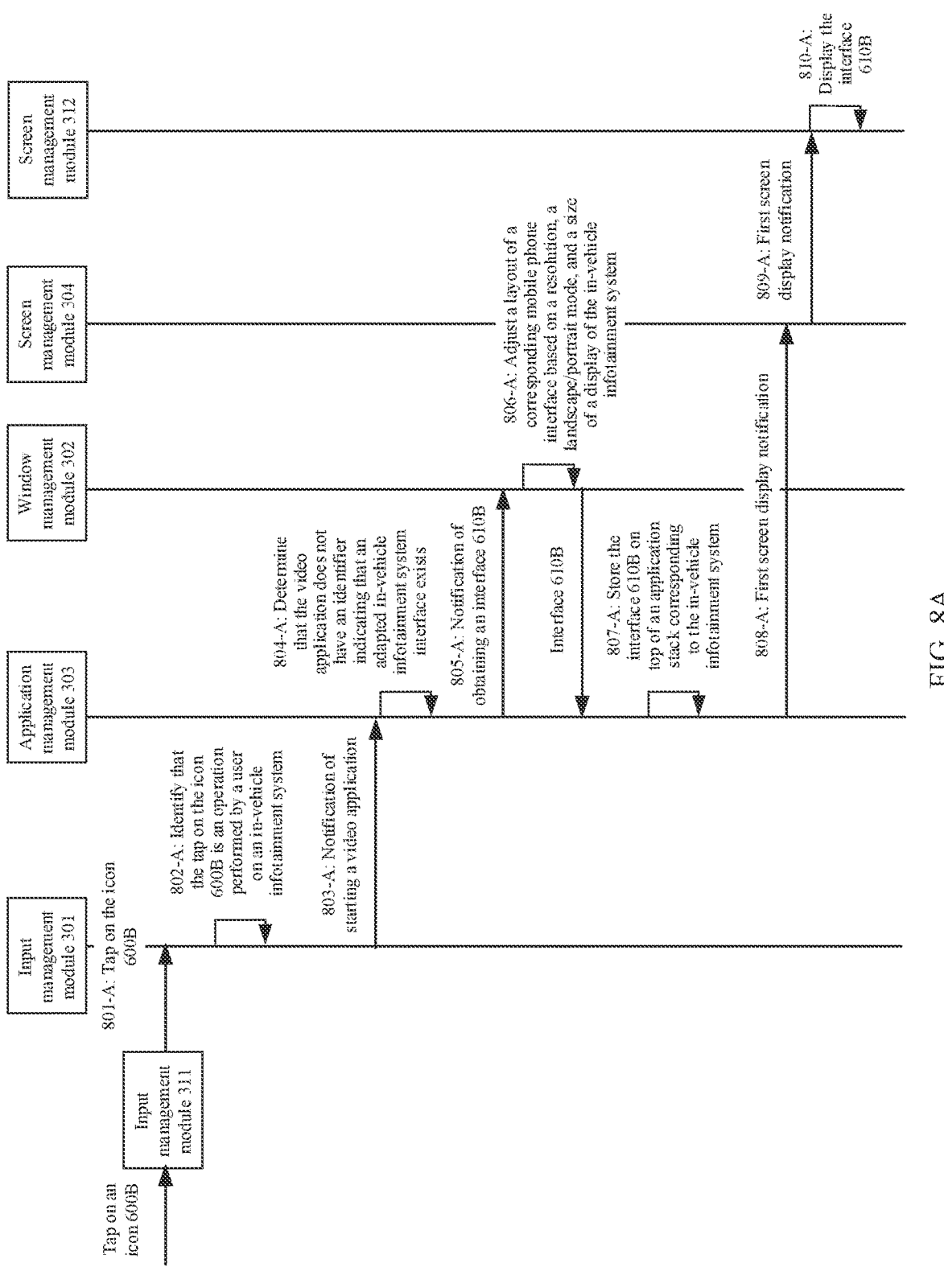
FIG. 8A is a schematic flowchart of a display method according to an embodiment of this application.

For example, the mobile phone has a software architecture shown in A in FIG. 3, and the in-vehicle infotainment system has a software architecture shown in B in FIG. 3. For example, if the video application does not have an adapted in-vehicle infotainment system interface, a method for displaying the in-vehicle infotainment system interface 610B in response to tapping the icon 600B by the user may be shown in FIG. 8A, and includes the following steps.

801-A: The input management module 301 receives an operation of tapping the icon 600B by the user.

802-A: The input management module 301 identifies that the operation of tapping the icon 600B by the user is an operation performed by the user on the in-vehicle infotainment system.

803-A: The input management module 301 sends, to the application management module 303, a notification of starting the video application on the in-vehicle infotainment system.

804-A: The application management module 303 receives the notification of starting the video application on the in-vehicle infotainment system, and determines that the video application does not have the identifier indicating that an adapted in-vehicle infotainment system interface exists.

805-A: The application management module 303 sends a notification of obtaining the interface 610B of the video application to the window management module 302.

Figures 6A, 6B, 6C:
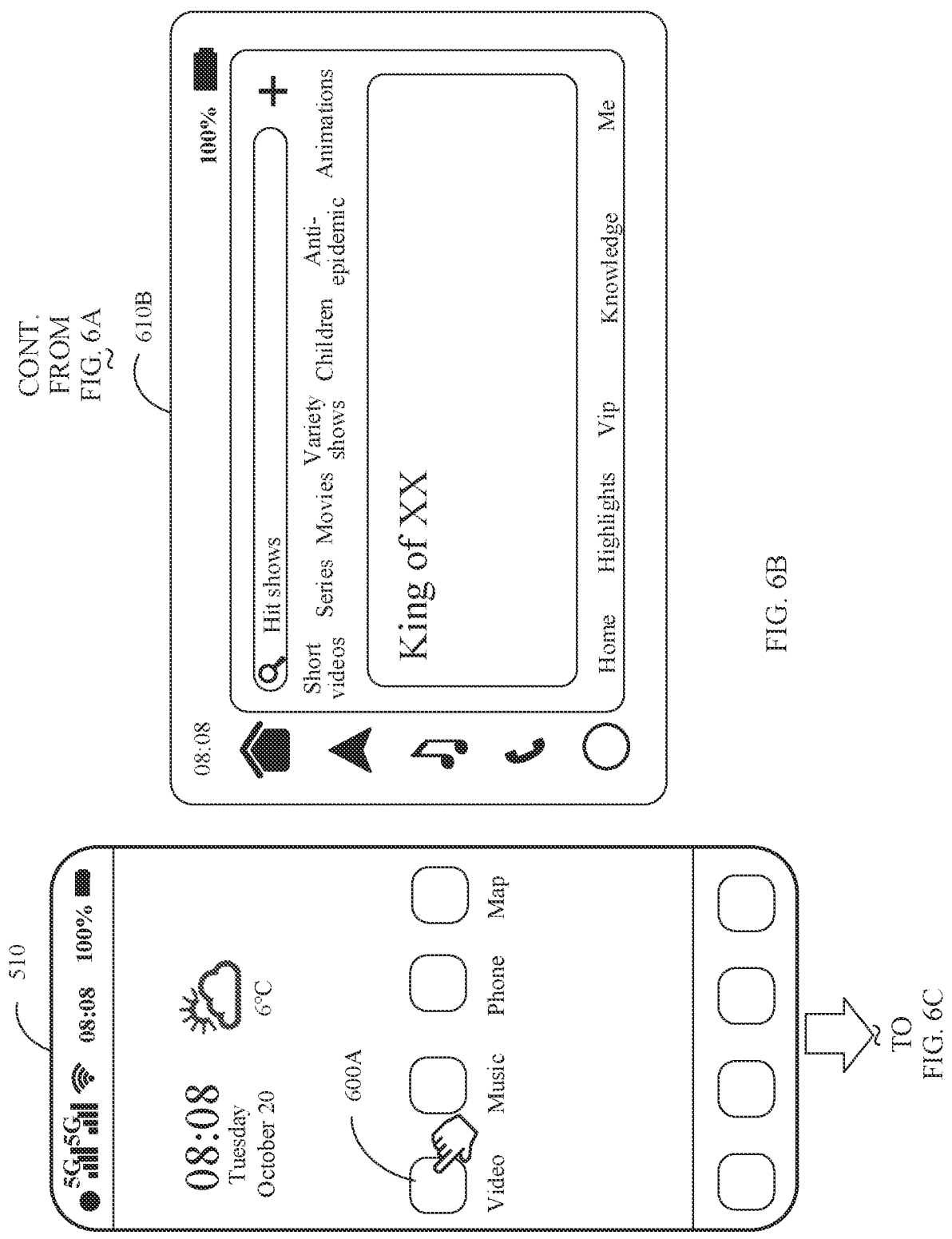
Figure 6C:
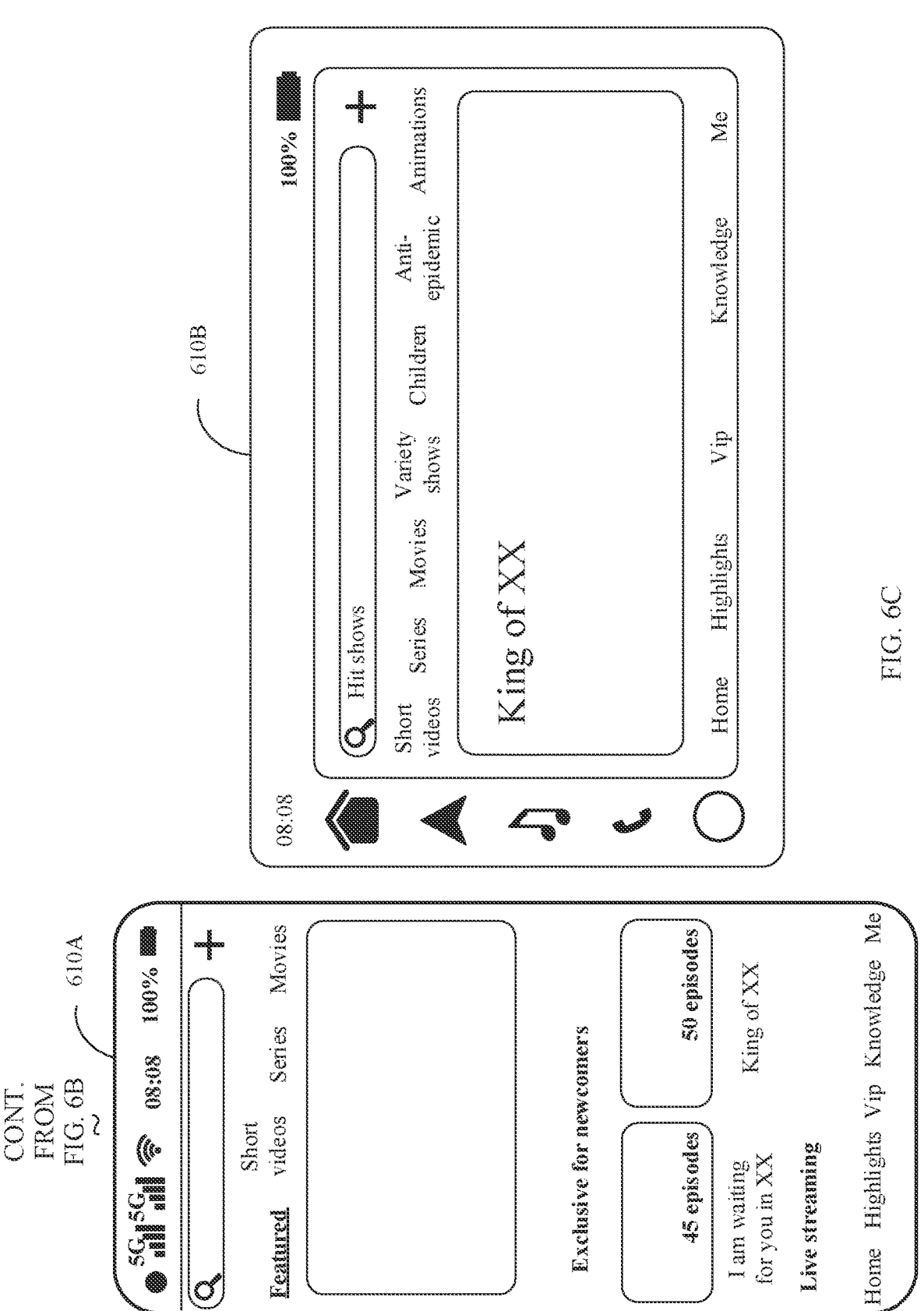

806-A: The window management module 302 receives the notification of obtaining the interface 610B of the video application, queries or reads information about the display of the in-vehicle infotainment system, adjusts a layout of the elements of the corresponding mobile phone interface based on the resolution, a landscape/portrait mode, and the size of the display of the in-vehicle infotainment system to obtain the interface 610B, and sends the interface 610B to the application management module 303. For example, a layout of elements of the interface 610A shown in FIG. 6C is adjusted.

807-A: The application management module 303 receives the interface 610B, and stores the interface 610B in the application stack corresponding to the in-vehicle infotainment system. The interface 610B is located on top of the application stack corresponding to the in-vehicle infotainment system. For example, when different applications share one application stack, the application management module 303 may pin the in-vehicle infotainment system interface of the video application on top of the application stack corresponding to the in-vehicle infotainment system. In addition, when different applications share one application stack, in some embodiments, if the application stack corresponding to the in-vehicle infotainment system is not created in the mobile phone, the application management module 303 may further create the application stack corresponding to the in-vehicle infotainment system after receiving the notification of starting the video application on the in-vehicle infotainment system. It should be noted that after receiving the notification of starting the video application on the in-vehicle infotainment system, the application management module 303 may first create the application stack corresponding to the in-vehicle infotainment system, and then obtain the interface 610B of the video application from the window management module 302. Alternatively, after receiving the notification of starting the video application on the in-vehicle infotainment system, the application management module 303 may simultaneously create the application stack corresponding to the in-vehicle infotainment system and send the notification of obtaining the interface 610B of the video application to the window management module 302.

For another example, when different applications each correspond to one application stack, the application management module 303 may pin the interface 610B on top of the application stack corresponding to the video application. In addition, when different applications each correspond to one application stack, in some embodiments, if the application stack corresponding to the video application is not created in the mobile phone, the application management module 303 may further create the application stack corresponding to the in-vehicle infotainment system after receiving the notification of starting the video application on the in-vehicle infotainment system.

808-A: The application management module 303 sends a first screen display notification to the screen management module 304. The first screen display notification is a notification of displaying the interface 610B of the video application on the display of the in-vehicle infotainment system.

809-A: After receiving the first screen display notification, the screen management module 304 sends the first screen display notification to the screen management module 312.

810-A: After receiving the first screen display notification, the screen management module 312 displays the interface 610B on the display of the in-vehicle infotainment system.

Figure 8B:
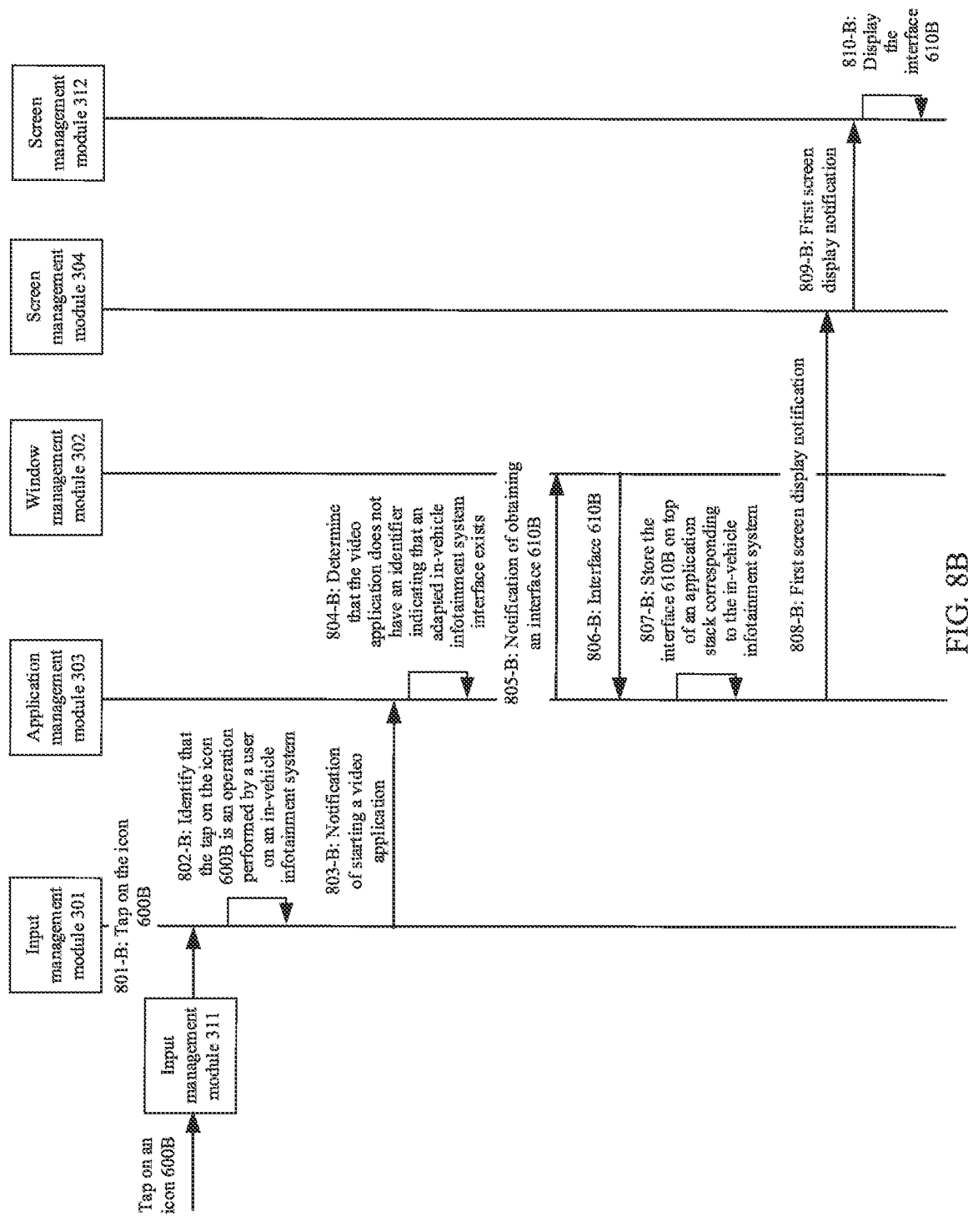
FIG. 8B is a schematic flowchart of another display method according to an embodiment of this application.

For another example, if the video application has an adapted in-vehicle infotainment system interface, a method for displaying the in-vehicle infotainment system interface 610B in response to tapping the icon 600B by the user may be shown in FIG. 8B, and includes the following steps.

801-B: The input management module 301 receives an operation of tapping the icon 600B by the user.

802-B: The input management module 301 identifies that the operation of tapping the icon 600B by the user is an operation performed by the user on the in-vehicle infotainment system.

803-B: The input management module 301 sends, to the application management module 303, a notification of starting the video application on the in-vehicle infotainment system.

804-B: The application management module 303 receives the notification of starting the video application on the in-vehicle infotainment system, and determines that the video application has the identifier indicating that an adapted in-vehicle infotainment system interface exists.

805-B: The application management module 303 sends a notification of obtaining the interface 610B of the video application to the window management module 302.

806-B: The window management module 302 receives the notification of obtaining the interface 610B, and sends the pre-adapted interface 610B of the video application to the application management module 303.

807-B: The application management module 303 receives the interface 610B, and stores a first in-vehicle infotainment system interface in the application stack corresponding to the in-vehicle infotainment system. The interface 610B is located on top of the application stack corresponding to the in-vehicle infotainment system. For a specific description of step 807-B, refer to the related description of step 807-A. Details are not described herein again.

808-B: The application management module 303 sends a first screen display notification to the screen management module 304. The first screen display notification is a notification of displaying the interface 610B of the video application on the display of the in-vehicle infotainment system.

809-B: After receiving the first screen display notification, the screen management module 304 sends the first screen display notification to the screen management module 312.

810-B: After receiving the first screen display notification, the screen management module 312 displays the interface 610B on the display of the in-vehicle infotainment system.

Further, when the mobile phone displays the interface 510 and the in-vehicle infotainment system displays the interface 610B, as shown in FIG. 6B, the mobile phone pins the interface 610A on top of the application stack corresponding to the mobile phone in response to tapping the icon 600A by the user, the mobile phone displays the interface 610A, and the in-vehicle infotainment system continues to display the interface 610B. The interface 610A is the mobile phone interface of the video application, and the interface 610B is the in-vehicle infotainment system interface of the video application. Because the application stack corresponding to the in-vehicle infotainment system and the application stack corresponding to the mobile phone are configured for the video application in the mobile phone, the mobile phone and the in-vehicle infotainment system can simultaneously display the interface of the video application.

Figure 8C:
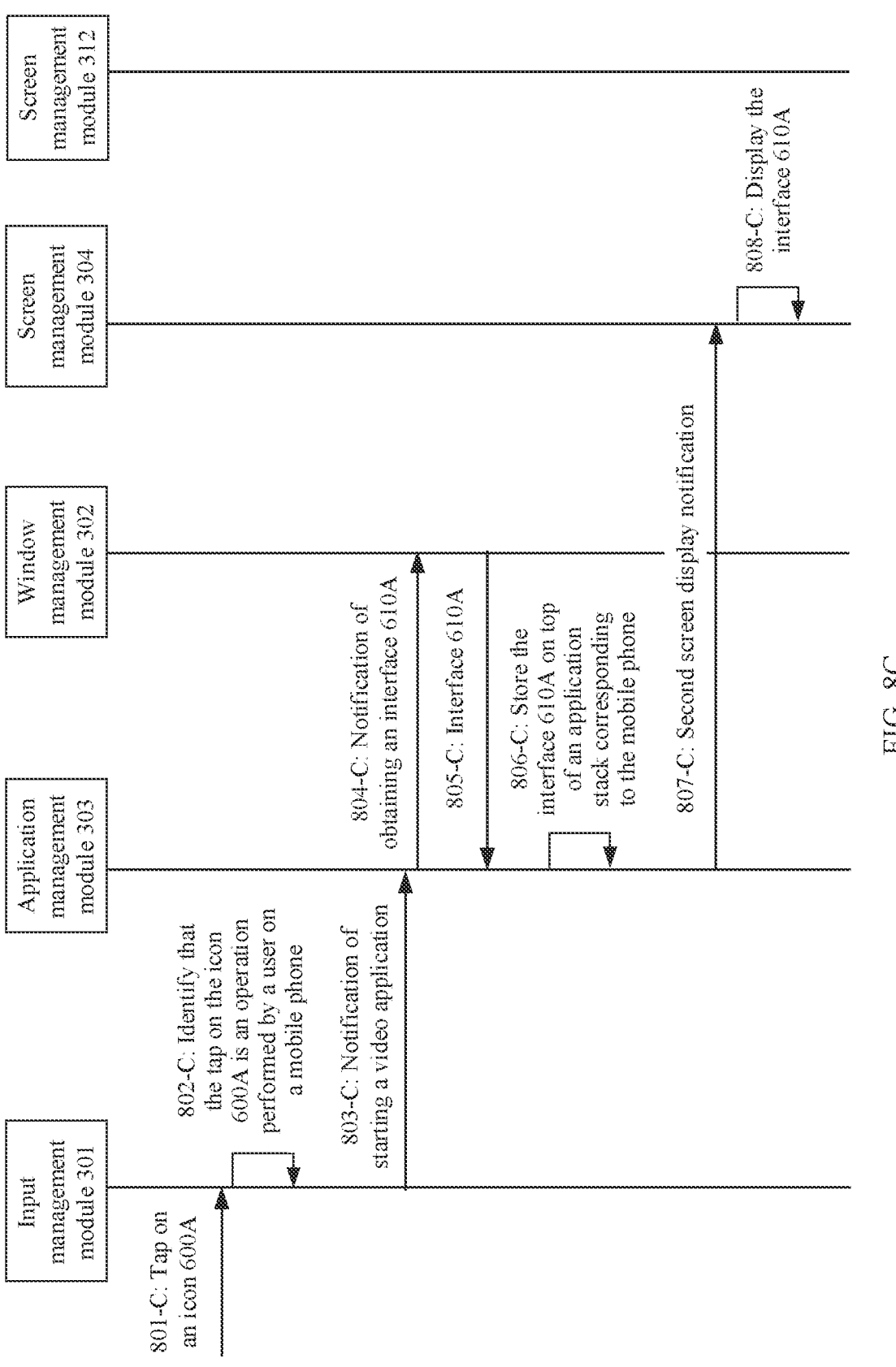
FIG. 8C is a schematic flowchart of another display method according to an embodiment of this application.

For example, the mobile phone has the software architecture shown in A in FIG. 3, and the in-vehicle infotainment system has the software architecture shown in B FIG. 3. A method for displaying the in-vehicle infotainment system interface 610B in response to tapping the icon 600A by the user may be shown in FIG. 8C, and includes the following steps.

801-C: The input management module 301 receives an operation of tapping the icon 600A by the user.

802-C: The input management module 301 identifies that the operation of tapping the icon 600A by the user is an operation performed by the user on the mobile phone.

803-C: The input management module 301 sends, to the application management module 303, a notification of starting the video application on the mobile phone.

804-C: The application management module 303 receives the notification of starting the video application on the mobile phone, and sends a notification of obtaining the interface 610A of the video application to the window management module 302.

805-C: The window management module 302 receives the notification of obtaining the interface 610A of the video application, and sends the interface 610A to the application management module 303.

806-C: The application management module 303 receives the interface 610A, and stores the interface 610A in the application stack corresponding to the mobile phone.

The interface 610A is located on top of the application stack corresponding to the mobile phone.

In some embodiments, if the application stack corresponding to the mobile phone is not created in the mobile phone, the application management module 303 may further create the application stack corresponding to the mobile phone after receiving the notification of starting the video application on the mobile phone. It should be noted that after receiving the notification of starting the video application on the mobile phone, the application management module 303 may first create the application stack corresponding to the mobile phone, and then send the notification of obtaining the interface 610A to the window management module 302. Alternatively, after receiving the notification of starting the video application on the mobile phone, the application management module 303 may simultaneously create the application stack corresponding to the mobile phone and send the notification of obtaining the interface 610A to the window management module 302.

807-C: The application management module 303 sends a second screen display notification to the screen management module 304. The second screen display notification is a notification of displaying the interface 610A on the mobile phone.

808-C: After receiving the second screen display notification, the screen management module 303 displays the interface 610A on a display of the mobile phone.

Figures 7A, 7B:
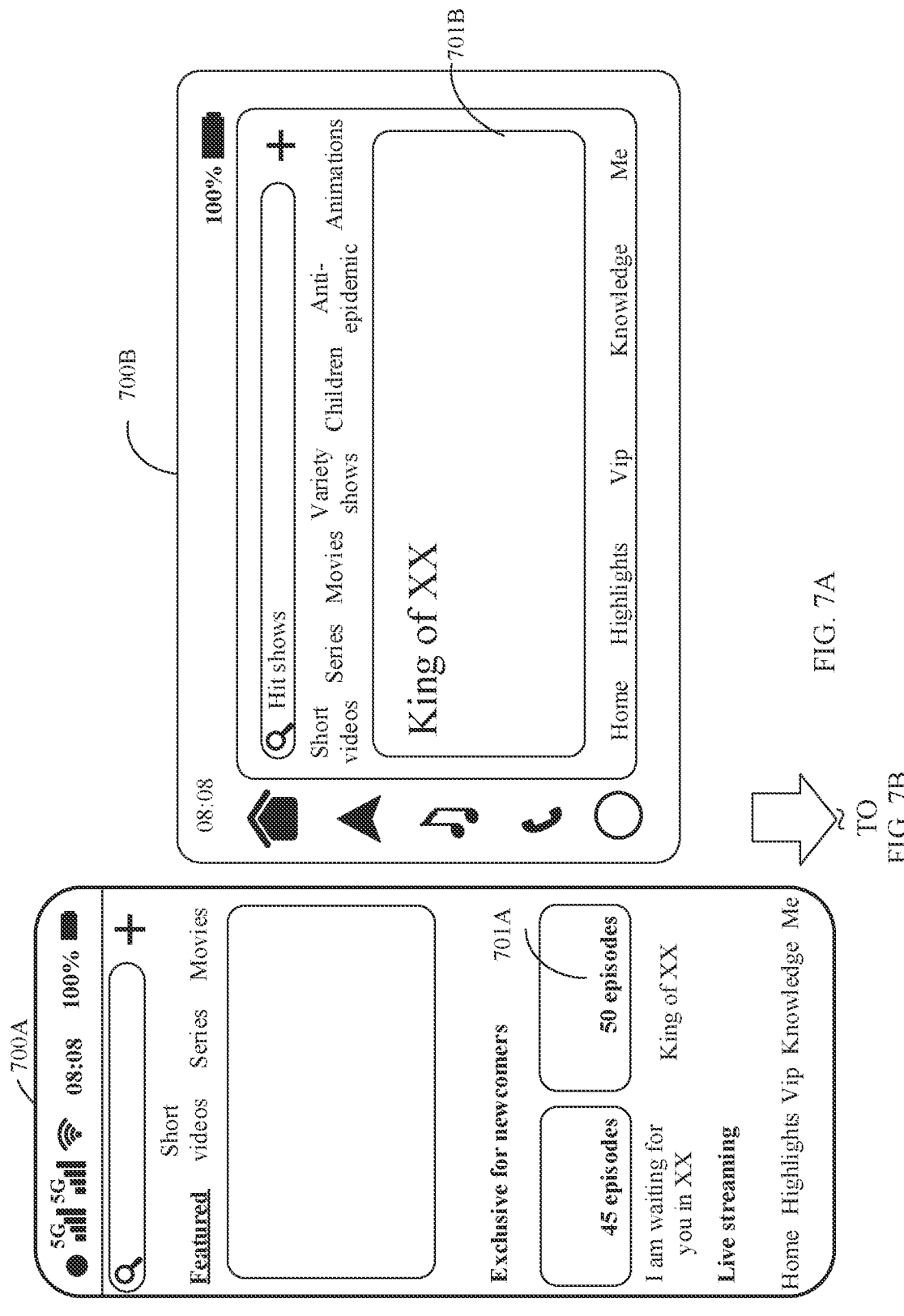
FIG. 7A to FIG. 7C are a schematic diagram of another in-vehicle infotainment system interfaces and mobile phone interfaces according to an embodiment of this application.

In addition, after the mobile phone is successfully connected to the in-vehicle infotainment system, in some other embodiments of this application, as shown in FIG. 7A, when the mobile phone displays an interface 700A and the in-vehicle infotainment system displays an interface 700B, the mobile phone pins an interface 710A on top of the application stack corresponding to the mobile phone and pins an interface 710B on top of the application stack corresponding to the in-vehicle infotainment system in response to tapping an option 701A by the user. In this way, the mobile phone displays the interface 710A, and the in-vehicle infotainment system displays the interface 710B, as shown in FIG. 7B. The mobile phone and the in-vehicle infotainment system display a playing interface of a television series named "King of XX". The option 701A and an option 701B are options corresponding to the television series named "King of XX". Alternatively, as shown in FIG. 7A, when the mobile phone displays the interface 700A and the in-vehicle infotainment system displays the interface 700B, the mobile phone pins the interface 710A on top of the application stack corresponding to the mobile phone and pins the interface 701B on top of the application stack corresponding to the in-vehicle infotainment system in response to tapping the option 701B by the user. In this way, the mobile phone displays the interface 710A, and the in-vehicle infotainment system displays the interface 710B, as shown in FIG. 7B. Therefore, after the video application is started on both the mobile phone and the in-vehicle infotainment system, the user may operate the mobile phone or the in-vehicle infotainment system, so that the in-vehicle infotainment system and the mobile phone display corresponding interfaces of the video application.

Figures 7A, 7B, 7C:
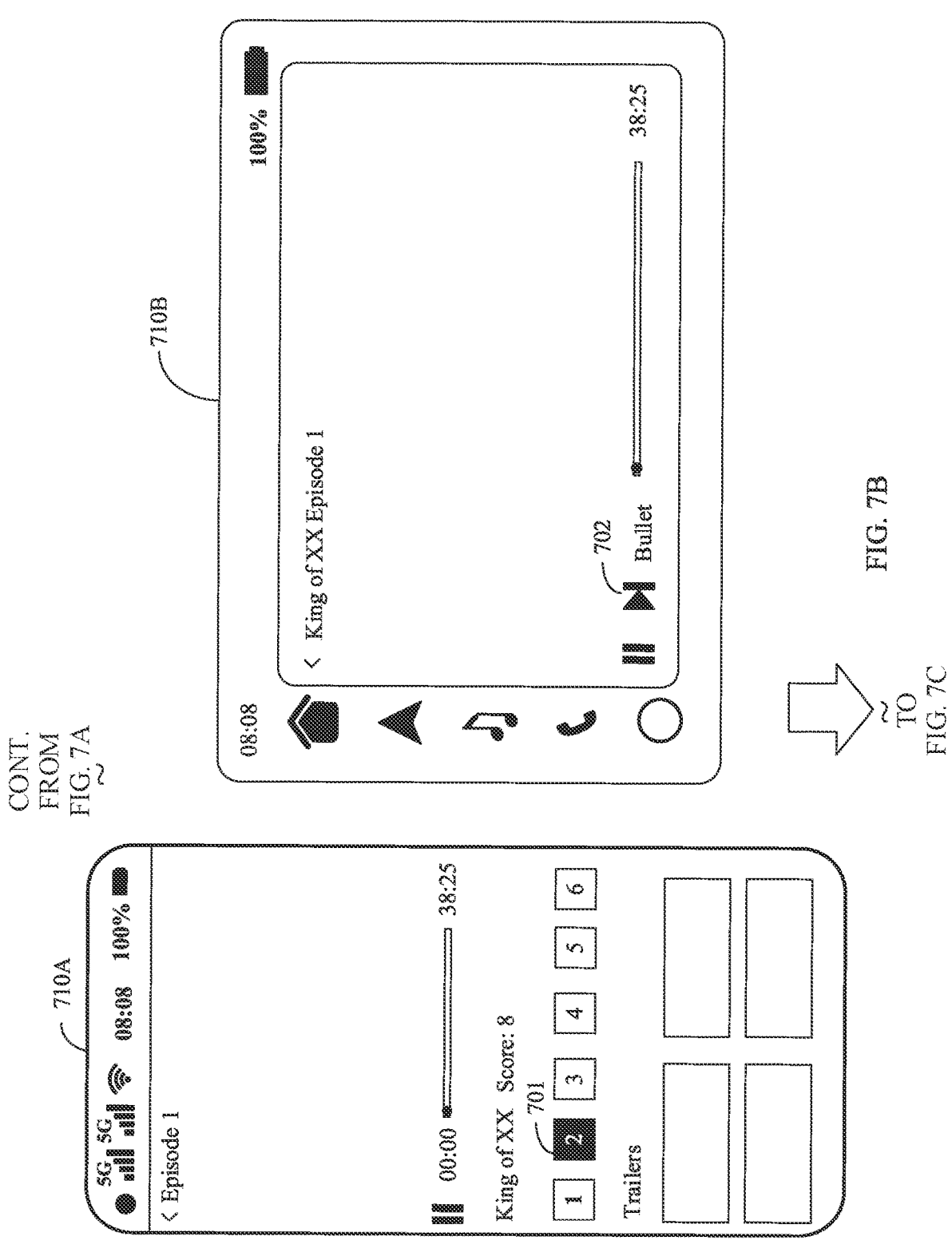

For another example, as shown in FIG. 7B, the mobile phone displays the interface 710A, and the in-vehicle infotainment system displays the interface 710B. The mobile phone pins an interface 720B on top of the application stack corresponding to the in-vehicle infotainment system and pins an interface 720A on top of the application stack corresponding to the mobile phone in response to tapping a control 701 on the mobile phone or tapping a control 702 on the in-vehicle infotainment system by the user, so that a second episode of the television series named "King of XX" can be played on the interface 720A and the interface 720B, as shown in FIG. 7C.

Figures 9A, 9B:
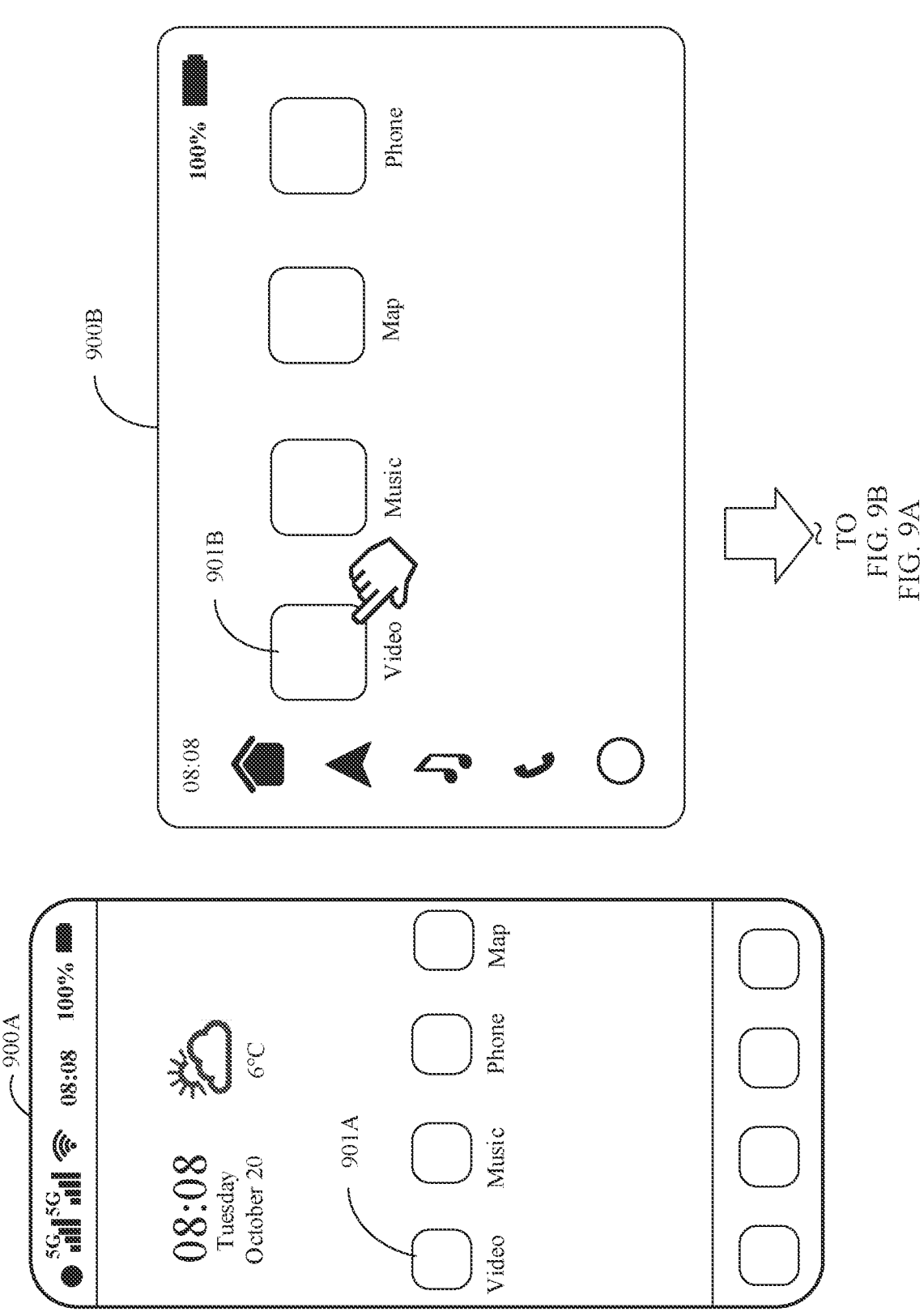
FIG. 9A to FIG. 9C are a schematic diagram of another in-vehicle infotainment system interfaces and mobile phone interfaces according to an embodiment of this application.
Figures 9A, 9B, 9C:
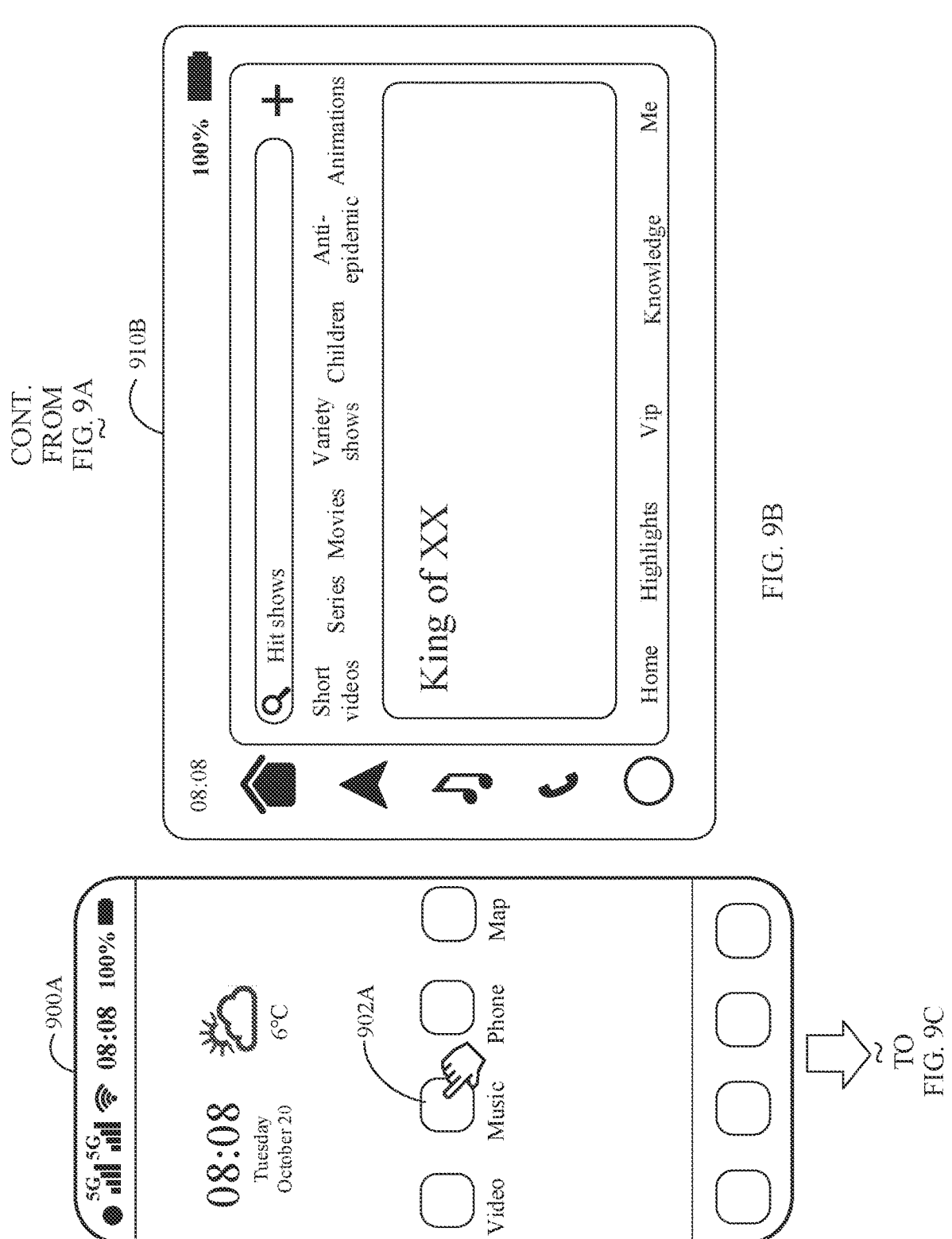

In still some embodiments, after the mobile phone is successfully connected to the in-vehicle infotainment system, as shown in FIG. 9A, the mobile phone displays an interface 900A, and the in-vehicle infotainment system displays an interface 900B. For example, the interface 900A includes an icon 901A and an icon 902A, and the interface 900B includes an icon 901B. An application installed on the mobile phone and identified by the icon 901A and the icon 901B is the video application, and an application installed on the mobile phone and identified by the icon 902A is Music. When the mobile phone displays the interface 900A and the in-vehicle infotainment system displays the interface 900B, the mobile phone pins an interface 910B on top of the application stack corresponding to the in-vehicle infotainment system in response to tapping the icon 901B by the user, the in-vehicle infotainment system displays the interface 910B, and the mobile phone continues to display the interface 900A, as shown in FIG. 9B. Further, as shown in FIG. 9B, the mobile phone pins an interface 920A on top of the application stack corresponding to the mobile phone in response to tapping the icon 902A by the user, the mobile phone displays the interface 920A, and the in-vehicle infotainment system continues to display the interface 910B, so that the user can use different applications on the mobile phone and the in-vehicle infotainment system after the mobile phone is successfully connected to the in-vehicle infotainment system. For example, after the mobile phone is successfully connected to the in-vehicle infotainment system, the user uses the in-vehicle infotainment system to display the in-vehicle infotainment system interface of the video application and perform navigation, and uses the mobile phone to display a mobile phone interface of the music application and listen to music.

Figures 10A, 10B:
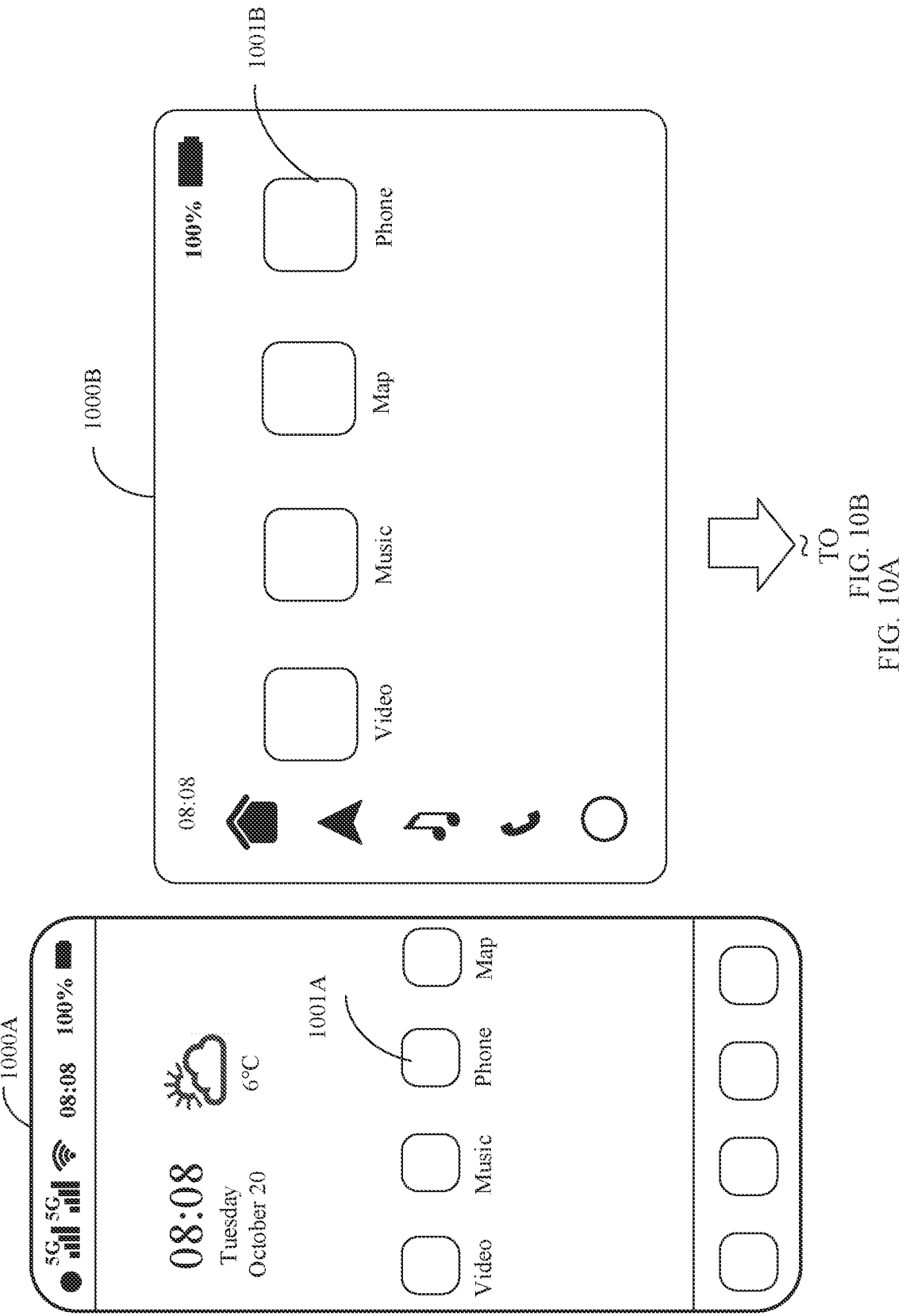
FIG. 10A and FIG. 10B are a schematic diagram of another in-vehicle infotainment system interfaces and mobile phone interfaces according to an embodiment of this application.
Figure 10B:
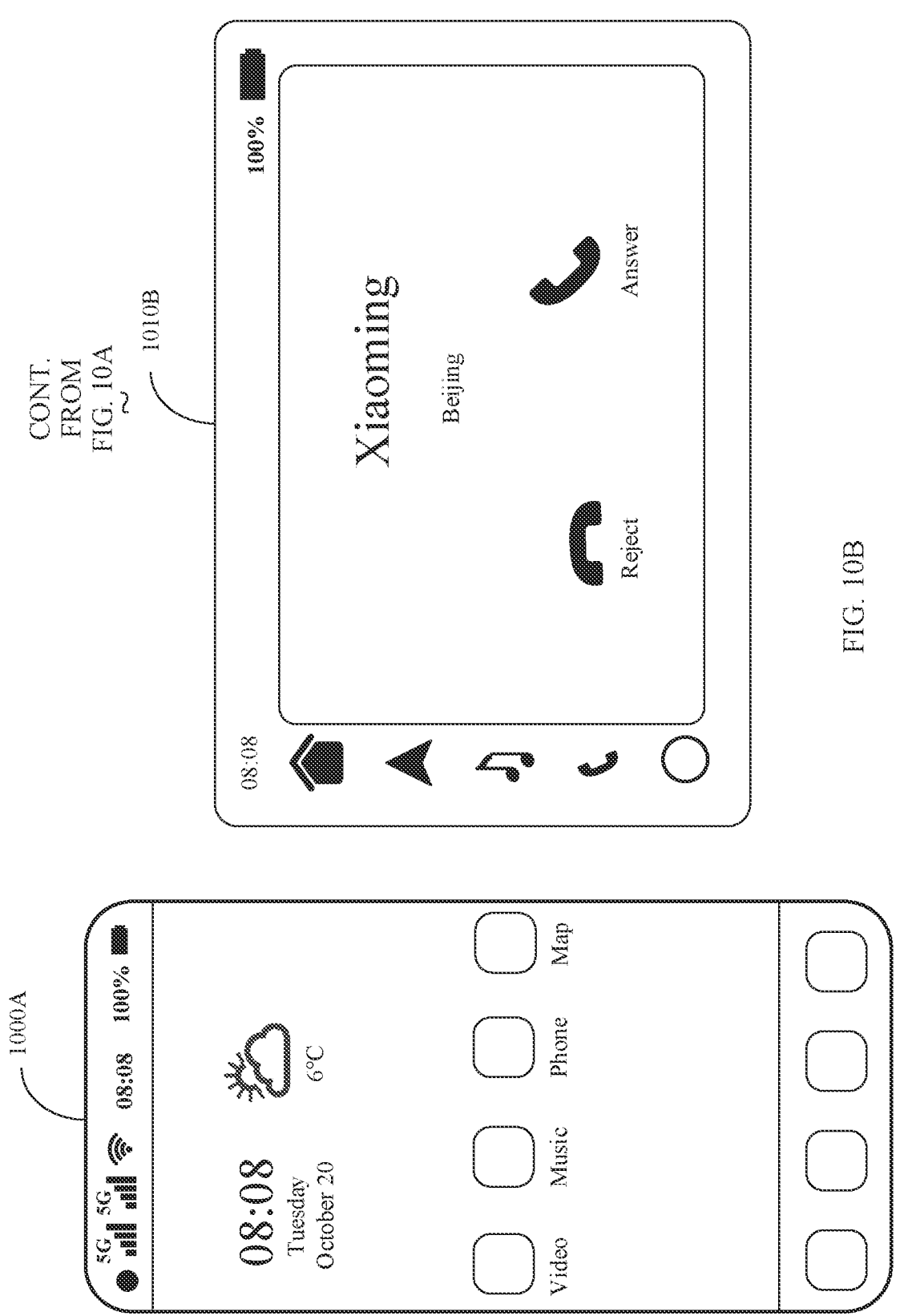

For some applications, for example, Phone, after the mobile phone is successfully connected to the in-vehicle infotainment system, the mobile phone may trigger, in response to a detected incoming call event, the in-vehicle infotainment system to display an incoming call interface. For example, as shown in FIG. 10A, the mobile phone displays an interface 1000A, and the in-vehicle infotainment system displays an interface 1000B. For example, the interface 1000A includes an icon 1001A, and the interface 900B includes an icon 1001B. An application installed on the mobile phone and identified by the icon 1001A and the icon 1001B is Phone. When the mobile phone displays the interface 1000A and the in-vehicle infotainment system displays the interface 1000B, the mobile phone receives an incoming call event. The mobile phone pins the interface 1000B on top of the application stack corresponding to the in-vehicle infotainment system in response to the incoming call event. In this way, the in-vehicle infotainment system displays the interface 1000B, and the mobile phone may continue to display the interface 1000A, as shown in FIG. 10B, so that the user can answer the call.

Figures 11A, 11B:
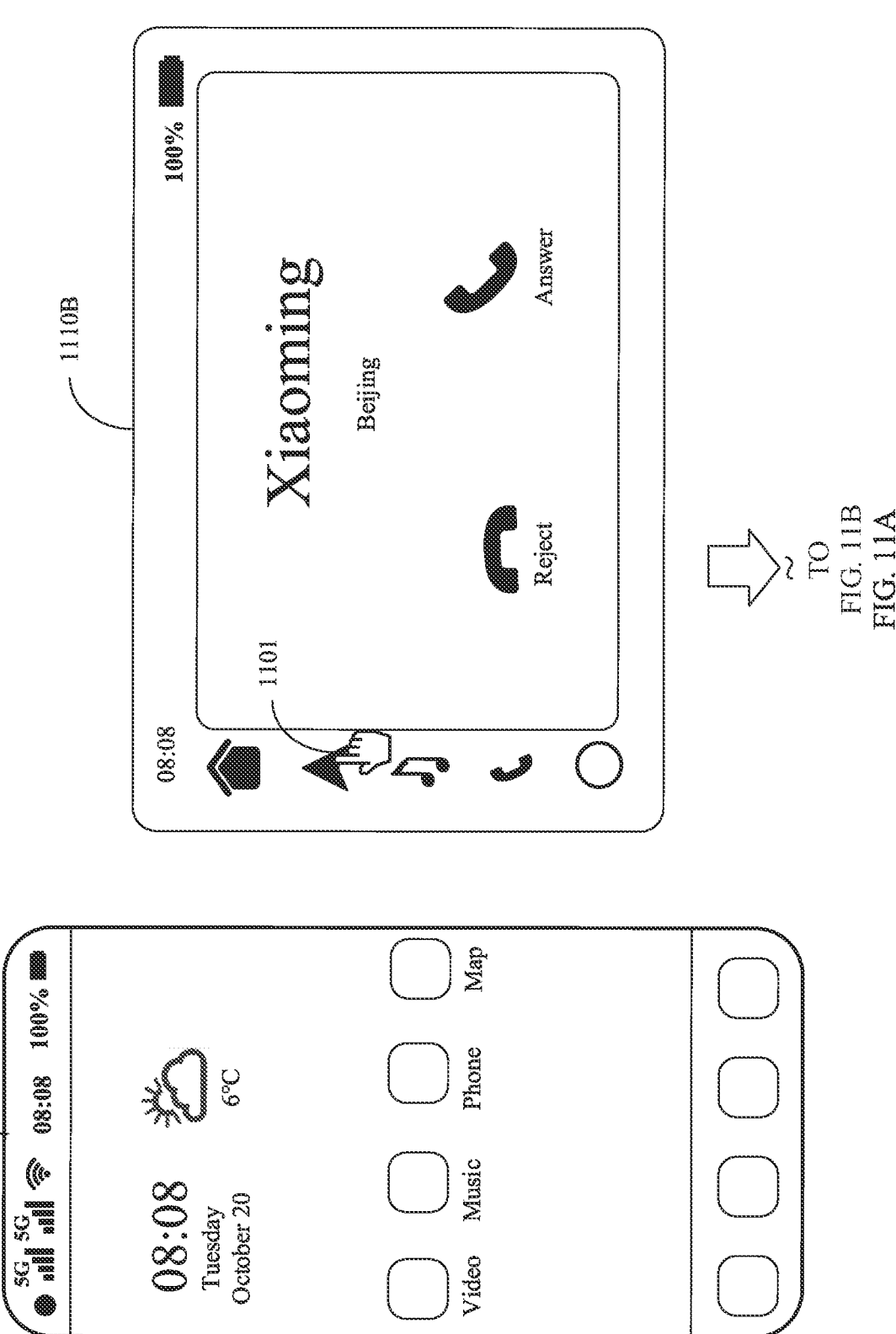
FIG. 11A and FIG. 11B are a schematic diagram of another in-vehicle infotainment system interfaces and mobile phone interfaces according to an embodiment of this application.
Figures 11A, 11B:
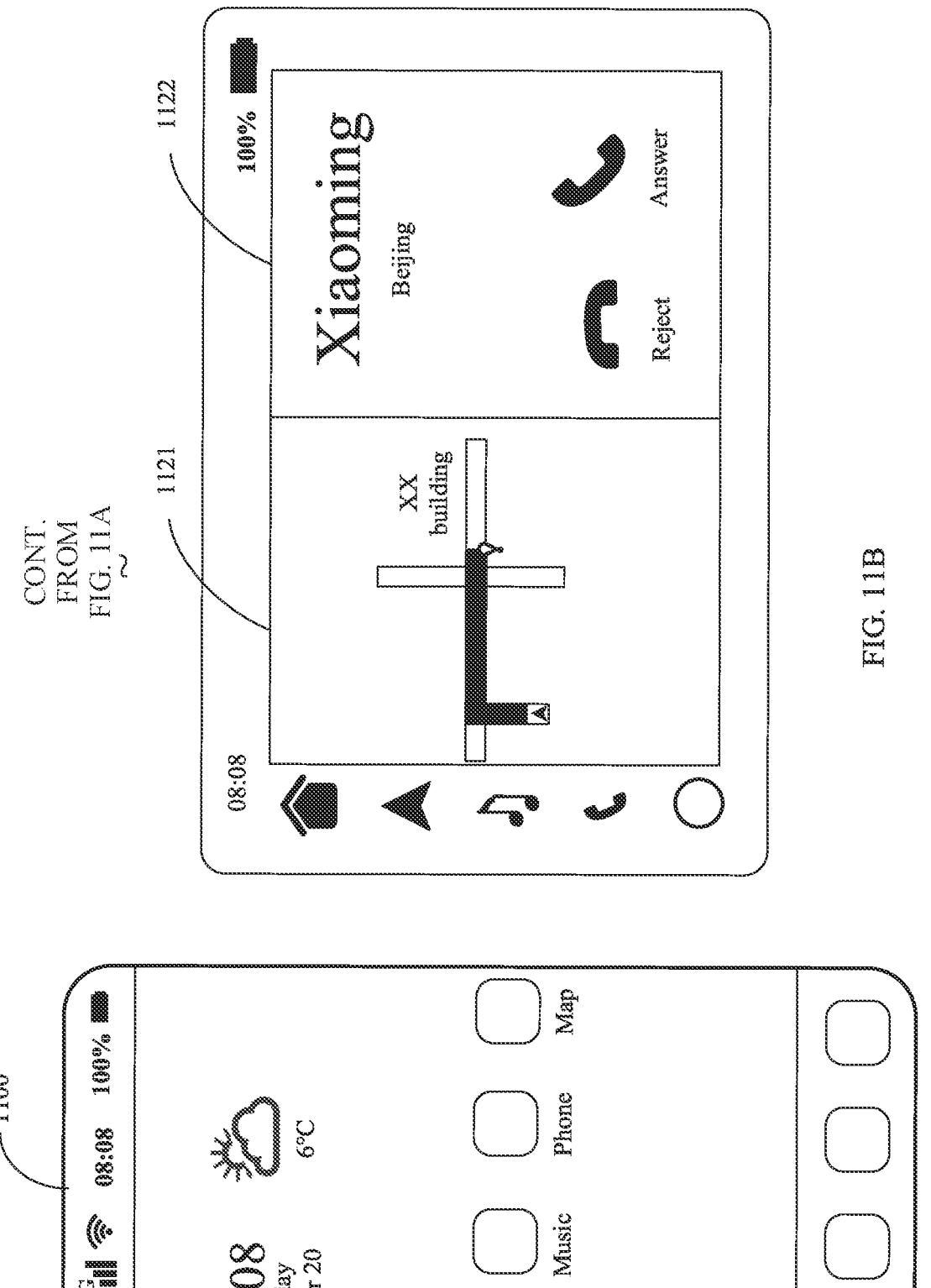

Further, in some embodiments, when one application stack is configured for each application in the application stack corresponding to the in-vehicle infotainment system, an example in which an application stack corresponding to Map and an application stack corresponding to Phone are configured in the application stack corresponding to the in-vehicle infotainment system is used. As shown in FIG. 11A, the mobile phone displays an interface 1100, and the in-vehicle infotainment system displays an interface 1100B.

The interface 1100B includes a navigation bar and an incoming call interface. For example, the navigation bar includes an icon 1101, and an application installed on the mobile phone and identified by the icon 1101 is Map. The mobile phone pins an in-vehicle infotainment system interface of the map application on top of the application stack corresponding to Map and pins the incoming call interface on top of the application stack corresponding to Phone in response to tapping the icon 1101 by the user. Therefore, the in-vehicle infotainment system can simultaneously display the incoming call interface and the in-vehicle infotainment system interface of Map, so that the user can make a call during navigation. For example, as shown in FIG. 11B, the incoming call interface is displayed in an area 1121, and the in-vehicle infotainment system interface of Map is displayed in an area 1122.

The foregoing embodiments may be used in combination with each other, or may be used separately. This is not limited.

Figure 12:
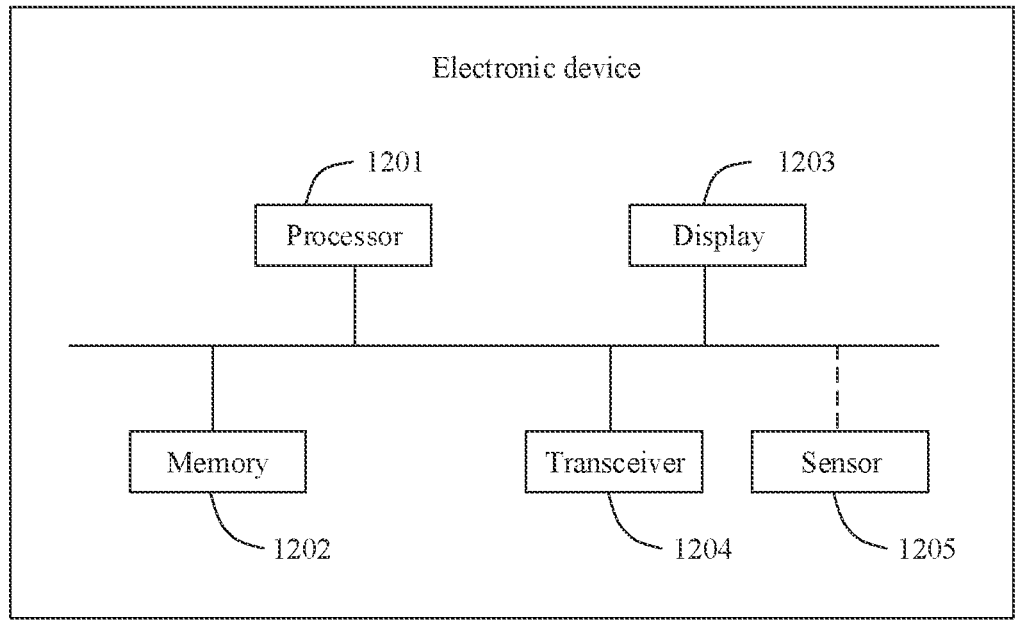
FIG. 12 is a schematic diagram of a structure of an electronic device according to an embodiment of this application.

Based on a same idea, an embodiment of this application further provides an electronic device. As shown in FIG. 12, the electronic device includes a processor 1201, a memory 1202, a display 1203, and a transceiver 1204. For example, the foregoing components may be connected through one or more communications buses. One or more computer programs are stored in the memory 1202 and are configured to be executed by the processor 1201. The one or more computer programs include instructions. The instructions may be used to enable the electronic device to perform the steps of the methods in the foregoing embodiments. Further, in some embodiments, the electronic device may further include a sensor 1205, for example, a touch sensor.

For example, the processor 1201 may be specifically the processor 210 shown in FIG. 2, the memory 1202 may be specifically the internal memory 221 shown in FIG. 2 and/or an external memory connected to the electronic device, the transceiver 1204 may be the mobile communications module 250 and/or the wireless communications module 260 shown in FIG. 2, the display 1203 may be specifically the display 294 shown in FIG. 2, and the sensor 1205 may be specifically the sensor 280 shown in FIG. 2. This is not limited in this embodiment of this application.

In addition, an embodiment of this application further provides a graphical user interface (graphical user interface, GUI) on an electronic device. The graphical user interface specifically includes a graphical user interface displayed when the electronic device performs the foregoing method embodiments.

According to the context, the term "when . . . " used in the foregoing embodiments may be interpreted as a meaning of "if . . . ", "after . . . ", "in response to determining . . . ", or "in response to detecting . . . ". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)".

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like. If no conflict occurs, the solutions in the foregoing embodiments may be combined for use.

It should be noted that a part of this patent application document includes copyright protected content. The copyright owner reserves the copyright except copies are made for the patent documents or the recorded content of the patent documents in the Patent Office.

What is claimed is:

1. A method, applied to a system comprising a first electronic device and a second electronic device, wherein the method comprises:

sending, by the first electronic device, information about a first application to the second electronic device, wherein the first application comprises a first interface for being displayed on the first electronic device and a second interface for being displayed on the second electronic device;

displaying, by the second electronic device, an icon of the first application in response to receiving the information about the first application;

starting, by the first electronic device, the first application in response to an operation performed by a user on an icon of the first application on the first electronic device;

displaying, by the first electronic device, the first interface;

receiving, by the second electronic device, the operation performed on the icon of the first application;

sending, by the first electronic device, the second interface to the second electronic device; and starting, by the second electronic device, the first application and displaying the second interface, wherein the first interface comprises a first option, and the method further comprises:

in response to an operation performed by the user on the first option, displaying, by the first electronic device, a third interface of the first application, and displaying, by the second electronic device, a fourth interface of the first application.

2. The method according to claim 1, wherein the second interface comprises a second option, and the method further comprises:

in response to an operation performed by the user on the second option, displaying, by the first electronic device, a fifth interface of the first application, and displaying, by the second electronic device, a sixth interface of the first application.

3. The method according to claim 1, wherein the starting, by the first electronic device, the first application in response to an operation performed by a user on an icon of the first application on the first electronic device comprises:

starting, by the first electronic device, the first application, and pinning the first interface on top of a first application stack, in response to the operation performed by the user on the icon of the first application on the first electronic device.

4. The method according to claim 1, wherein after the receiving, by the second electronic device, the operation performed on the icon of the first application, the method further comprises:

pinning, by the first electronic device, the second interface on top of an application stack.

5. The method according to claim 4, wherein the first electronic device further comprises a second application, and the application stack is used to store the second interface of the first application and a seventh interface of the second application.

6. The method according to claim 4, wherein the first electronic device further comprises a second application, the application stack comprises a first application stack corresponding to the first application and a second application stack corresponding to the second application, the first application stack corresponding to the first application is used to store the second interface of the first application, and the second application stack corresponding to the second application is used to store a seventh interface of the second application; and the pinning, by the first electronic device, the second interface on top of the application stack comprises:

pinning, by the first electronic device, the second interface on top of the first application stack corresponding to the first application.

7. The method according to claim 6, wherein the method further comprises:

receiving, by the second electronic device, an operation performed on an icon of the second application;

pinning, by the first electronic device, the seventh interface on top of the second application stack corresponding to the second application, and sending the seventh interface to the second electronic device; and starting, by the second electronic device, the second application, displaying the seventh interface in a first display area, and displaying the second interface in a second display area, wherein the first display area and the second display area are two different display areas of the second electronic device.

8. The method according to claim 1, wherein before the sending, by the first electronic device, information about a first application to the second electronic device, the method further comprises:

in response to detecting the second electronic device, establishing, by the first electronic device, a connection to the second electronic device; or establishing, by the first electronic device, the connection to the second electronic device through a data cable.

9. The method according to claim 1, wherein the first electronic device is a mobile phone or a tablet computer, and the second electronic device is an in-vehicle infotainment system.

10. A method, wherein the method comprises:

establishing, by a first electronic device, a connection to a second electronic device, wherein the first electronic device comprises a first application, the first application comprises a first interface for being displayed on the first electronic device and a second interface for being displayed on the second electronic device, the first electronic device displays an icon of the first application, and the second electronic device displays an icon of the first application;

starting, by the first electronic device, the first application in response to an operation performed by a user on the icon of the first application on the first electronic device;

displaying, by the first electronic device, the first interface;

receiving first indication information from the second electronic device, wherein the first indication information is used to indicate an operation performed on the icon of the first application on the second electronic device; and sending the second interface to the second electronic device in response to receiving the first indication information, wherein the first interface comprises a first option, and the method further comprises:

displaying, by the first electronic device, a third interface of the first application and sending a fourth interface of the first application to the second electronic device in response to an operation performed by the user on the first option.

11. The method according to claim 10, wherein the second interface comprises a second option, and the method further comprises:

receiving second indication information from the second electronic device, wherein the second indication information is used to indicate an operation performed on the second option on the second electronic device; and displaying, by the first electronic device, a fifth interface of the first application and sending a sixth interface of the first application to the second electronic device in response to receiving the second indication information.

12. The method according to claim 10, wherein the starting, by the first electronic device, the first application in response to an operation performed by a user on the icon of the first application on the first electronic device comprises:

starting, by the first electronic device, the first application, and pinning the first interface on top of a first application stack, in response to the operation performed by the user on the icon of the first application on the first electronic device.

13. The method according to claim 10, wherein after the receiving second indication information from the second electronic device, the method further comprises:

pinning, by the first electronic device, the second interface on top of an application stack.

14. The method according to claim 13, wherein the first electronic device further comprises a second application, the application stack comprises a first application stack corresponding to the first application and a second application stack corresponding to the second application, the first application stack corresponding to the first application is used to store the second interface of the first application, and the second application stack corresponding to the second application is used to store a seventh interface of the second application; and the pinning, by the first electronic device, the second interface on top of the application stack comprises:

pinning, by the first electronic device, the second interface on top of the first application stack corresponding to the first application.

15. The method according to claim 14, wherein the method further comprises:

receiving third indication information from the second electronic device, wherein the third indication information is used to indicate an operation performed on an icon of the second application on the second electronic device; and pinning, by the first electronic device, the seventh interface on top of the second application stack corresponding to the second application, and sending the seventh interface to the second electronic device.

16. An electronic device, comprising at least one processor, at least one memory, a transceiver, and a display, wherein:

the at least one memory stores one or more computer programs, the one or more computer programs comprise instructions, and when the instructions are executed by the at least one processor, the electronic device is enabled to perform operations comprising:

establishing a connection to a second electronic device;

starting a first application in response to an operation performed by a user on an icon of the first application on the electronic device, wherein the first application comprises a first interface for being displayed on the electronic device;

displaying the first interface;

receiving first indication information from the second electronic device, wherein the first application further comprises a second interface for being displayed on the second electronic device, and the first indication information is used to indicate an operation performed on an icon of the first application on the second electronic device; and sending the second interface to the second electronic device in response to receiving the first indication information, wherein the first interface comprises a first option, and the operations further comprise:

displaying a third interface of the first application and sending a fourth interface of the first application to the second electronic device in response to an operation performed by the user on the first option.

17. The electronic device according to claim 16, wherein the second interface comprises a second option, and the operations further comprise:

in response to an operation performed by the user on the second option, displaying a fifth interface of the first application, and displaying, by the second electronic device, a sixth interface of the first application.

18. The electronic device according to claim 16, wherein the starting the first application in response to an operation performed by a user on the icon of the first application on the electronic device comprises:

starting the first application, and pinning the first interface on top of a first application stack, in response to the operation performed by the user on the icon of the first application on the electronic device.

19. The electronic device according to claim 16, wherein after the receiving second indication information from the second electronic device, the operations further comprise:

pinning the second interface on top of an application stack.

20. The electronic device according to claim 16, wherein the electronic device is a mobile phone or a tablet computer, and the second electronic device is an in-vehicle infotainment system.

* * * * *